(12) United States Patent
Huettner et al.

(10) Patent No.: US 11,649,085 B2
(45) Date of Patent: May 16, 2023

(54) PLASTIC CONTAINER WITH TENSION BAND GEOMETRY AT BASE REGION

(71) Applicant: KRONES AG, Neutraubling (DE)

(72) Inventors: Gerald Huettner, Vilseck (DE); Thomas Ringl, Ebermannsdorf (DE); Bastian Tissmer, Regensburg (DE); Joerg Wortmann, Fuerth (DE)

(73) Assignee: KRONES AG

( * ) Notice: Subject to any disclaimer, the term of this patent is extended or adjusted under 35 U.S.C. 154(b) by 166 days.

(21) Appl. No.: 16/938,815

(22) Filed: Jul. 24, 2020

(65) Prior Publication Data
US 2021/0024240 A1 Jan. 28, 2021

(30) Foreign Application Priority Data
Jul. 24, 2019 (DE) ...................... 10 2019 119 984.0

(51) Int. Cl.
*B65D 1/02* (2006.01)
*B29C 49/18* (2006.01)
*B29L 31/00* (2006.01)

(52) U.S. Cl.
CPC ............ *B65D 1/0284* (2013.01); *B29C 49/18* (2013.01); *B29L 2031/7158* (2013.01)

(58) Field of Classification Search
CPC .. B65D 1/0284; B65D 1/0561; B65D 1/0223; B65D 23/001
USPC ........ 215/375, 374, 373, 377, 376; 220/606, 220/605, 604, 628; D9/548
See application file for complete search history.

(56) References Cited

U.S. PATENT DOCUMENTS

| | | | |
|---|---|---|---|
| 3,871,541 A * | 3/1975 | Adomaitis ........... | B65D 1/0284 220/608 |
| 3,935,955 A * | 2/1976 | Das ...................... | B65D 1/0284 220/608 |
| 5,484,072 A | 1/1996 | Beck et al. ................. | 215/375 |
| 5,906,286 A | 5/1999 | Matsuno et al. ............. | 215/375 |

(Continued)

FOREIGN PATENT DOCUMENTS

| | | | |
|---|---|---|---|
| DE | 695 05 027 | 5/1999 | ............... B65D 1/02 |
| DE | 696 06 084 | 9/2000 | ............... B65D 1/02 |

(Continued)

OTHER PUBLICATIONS

German Search Report issued in related German Patent Application Serial No. 10 2019 119 984.0 with machine translation (14 pages).

(Continued)

*Primary Examiner* — Robert J Hicks
(74) *Attorney, Agent, or Firm* — Hayes Soloway P.C.

(57) ABSTRACT

A one piece plastic container for beverages, has a base region, a main body extending in the longitudinal direction of the plastic container to the base region and a mouth region with a container mouth, with the mouth region adjoining the main body in the longitudinal direction at least indirectly, wherein the base region has at least three standing feet, wherein at least one groove having a groove base extending in the circumferential direction over a circumferential angle is arranged between two, in particular adjacent feet. The wall of the container is curved inwards at least in sections in the region of the groove base of a groove.

11 Claims, 16 Drawing Sheets

(56) References Cited

U.S. PATENT DOCUMENTS

| | | | | |
|---|---|---|---|---|
| 6,019,236 | A * | 2/2000 | Slat | B65D 1/0284 220/608 |
| 9,339,969 | B2 | 5/2016 | Asbrand et al. | |
| 10,202,221 | B2 | 2/2019 | Boukobza | B65D 23/00 |
| 10,358,250 | B2 | 7/2019 | Wortmann et al. | B65D 1/0261 |
| 2008/0302758 | A1* | 12/2008 | Mody | B65D 1/0284 215/373 |
| 2014/0110873 | A1 | 4/2014 | Asbrand et al. | B29C 49/783 |
| 2015/0259090 | A1 | 9/2015 | Dornbach | |
| 2019/0210758 | A1 | 7/2019 | Casper et al. | |
| 2019/0315040 | A1 | 10/2019 | Huettner et al. | B29C 49/06 |

FOREIGN PATENT DOCUMENTS

| | | | | |
|---|---|---|---|---|
| DE | 102012110023 | | 4/2014 | B29C 49/18 |
| DE | 102013110139 | | 3/2015 | B65D 1/02 |
| DE | 102016115646 | | 3/2018 | B65D 1/02 |
| DE | 102016118495 | | 3/2018 | B65D 1/02 |
| EP | 219696 | A * | 4/1987 | B65D 1/0284 |
| EP | 0225155 | A2 * | 6/1987 | B65D 1/02 |
| EP | 2 764 979 | | 8/2014 | B29C 49/18 |
| EP | 3059175 | A1 * | 8/2016 | B65D 1/0284 |
| FR | 302223 | A1 * | 12/2018 | B65D 1/02 |
| JP | 5-229544 | | 9/1993 | B65D 1/02 |
| WO | WO 2012/069759 | | 5/2012 | B65D 1/02 |
| WO | WO2018114439 | | 6/2018 | B29C 49/48 |

OTHER PUBLICATIONS

European Search Report issued in related EPO Patent Application Serial No. 20187554.9-1009 with machine translation (15 pages).
European Official Action issued in related EPO Patent Application Serial No. 20187554.9-1009 with machine translation (16 pages).

* cited by examiner

PLASTIC CONTAINER WITH TENSION BAND GEOMETRY AT BASE REGION

BACKGROUND OF THE INVENTION

The present invention relates to a plastic container and in particular to a plastic bottle. In particular, the present invention relates to a plastic material for beverages. In addition, the invention is also directed to a base structure for such a plastic container. Plastic containers are produced in the usual manner in the prior art by blow-moulding processes and in particular stretch blow-moulding processes. For this purpose, in particular heated plastic preforms are expanded into plastic containers or plastic bottles within blow moulds. Particularly critical in the case of containers produced in this way are the container bases, since these are exposed to relatively high loads, such as, for example, not exclusively the weight of the actual filled bottle. It is known from the state of the art that these container bases or bottle bases have a multiplicity of standing feet and grooves extend between these standing feet. It is known from the state of the art that tension bands are provided between the feet, which tension bands guide for instance forces acting on the centre of the base, such as an injection point of a plastic container, via the tension band onto a side wall of the plastic container.

A goal in the production of such containers is to reduce the material consumption as further as possible while at the same time producing as high a base stability as possible in order, on the one hand, to withstand the inherent weight of a filled bottle and, on the other hand, to be able to withstand any internal pressure which may arise, in particular in the case of carbon-containing drinks.

DE 10 201 3 110 139 A1 discloses a plastic container with a petaloid base, in which a tension band is formed as a groove base between in each case two adjacent feet, which tension band is curved outwards and has a constant curvature when viewed in the circumferential direction. The base wall of the container is thus curved outwards, in particular in the region of a groove base and in particular in the region of a geometric centre of the groove base, comparable to a region of a spherical surface.

In the blowing process of a plastic container, PET material is blown with blowing pressure to the mould. Internal laboratory measurements of the applicant have shown that, for example in the case of containers with bases according to the application specified above, too much material remains hanging on the tension band of the base during the blowing process and cools down very quickly, so that the material can no longer be stretched properly. In this case, unattractive material compositions are formed on the tension band, which reduce the appearance and the soil performance in the form of wall thickness, bursting test, thermal test and stress-crack result, in particular at 0.2l to 5l volumes.

The aim of the present invention is to overcome the disadvantages known from the prior art and to provide a plastic container, a blow-moulding device for producing said plastic containers, and a method for producing the plastic containers, which enable improved base stability, in particular without requiring an increased use of material for this purpose.

Summary of the Invention

A plastic container according to the invention, in particular for beverages, has a base region, a main body which adjoins said base region in the longitudinal direction of the plastic container, and a mouth region which adjoins said main body in the longitudinal direction at least indirectly and has a container mouth. In this case, the base region has at least three standing feet, wherein at least one groove having a groove base extending in the circumferential direction over a (predetermined) circumferential angle is arranged between two of these standing feet, which are in particular adjacent. The container is preferably designed in one piece.

According to the invention, the wall of the container (or its base region) is curved inwards at least in sections in the region of the groove base of a groove, in particular when the (respective) section is viewed along a circumferential direction. Preferably, the wall of the container (or its base region) is curved inwards at least in sections in the region of the groove base of each groove, in particular when the (respective) section is viewed along a circumferential direction. Preferably, the wall of the container is curved inwards at least along a region of a (preferably each) groove base, wherein this region (at least in sections and preferably completely) extends inwards over the (entire) predetermined circumferential angle (over which the groove base extends), in particular when viewing the region along a circumferential direction and/or along a line formed on the wall (and/or wall outer surface).

The longitudinal direction is, in particular, a direction along a central axis of the plastic container. The central axis of the plastic container extends in particular (centrally) through the (opening of the) container mouth (and also in particular centrally through a base region of the container, in particular through an injection point). In the upright position of the container, the central axis extends in particular parallel to a vertical direction.

A circumferential direction is preferably to be understood as meaning a direction of rotation about the central axis (or longitudinal direction) of the container (or the longitudinal direction) of the container. In the following, a radial direction (in relation to the longitudinal direction) means a direction with respect to the longitudinal direction (or the central axis of the container), which direction is perpendicular to the longitudinal direction (or the central axis) and which, in particular, moves away from said longitudinal direction (in particular from the central axis) (straight and in particular in a direction perpendicular to the central axis). The circumferential angle is preferably understood as an angle in the circumferential direction about the central axis after a projection into a plane perpendicular to the central axis. In particular, the circumferential angle over which the groove base extends is measured (as an angle in the circumferential direction about the central axis) at the projection of the groove base in a plane perpendicular to the longitudinal axis.

Preferably, the base body serves to receive the essential filling volume (of a beverage). The base body has a (side) wall completely surrounding in a circumferential direction. In this case, the main body can have a substantially circular (in particular circular) cross section (with a predetermined main diameter, cross section in section in the plane perpendicular to the central axis). However, it is also possible for the main body to have a substantially square or rectangular cross-section, in particular with rounded corners.

The wall of the container is preferably curved inwards along the geometric centre of one (each groove) and/or along the geometric centre of one (each groove base) in particular in a region (viewed in the circumferential direction) between two feet. The wall of the groove base is preferably curved inwards in the region (in particular in the entire region) between two feet (viewed in the circumferential direction). If one follows a line formed on the wall of the groove base, which is formed in such a way that the point of the line has the same (radial) distance from the central axis, this line has a concave curvature or concave curvature in particular in the region of the geometric center of the groove base and preferably in the region in each case (along the circumferential direction) from the view of the container interior (for example from the view of the container mouth and/or from the point of view of a point on the central axis in the interior of the container).

The wall of the container is preferably curved outwards in a radial direction at least in sections in the region of the groove base of a groove and preferably in the region of the groove base of each groove. Such a curvature of the wall outward in the radial direction offers the advantage that the forces—similar to a spherical surface—are transmitted or transmitted outward along in the radial direction. As a result, it is possible for the groove base or each groove base to function as a tension band. Preferably, at least the region of a groove base, which is located between two feet when viewed in the circumferential direction, has a curvature or curvature to the outside in the radial direction.

Preferably, the groove base forms, at least in sections and preferably (almost) in its entirety, a saddle surface which (in particular at each point) has a curvature or curvature to the outside (in particular at each point) in a first predefined direction and has a curvature or curvature towards the inside in a second pre-given direction.

Preferably, one of the walls of the groove base has the following (hypothetical) line which extends in the radial direction, a curvature or convex curvature which is convex from the point of view of the container interior (for example from the view of the central axis in the container interior). A convex curvature or convex curvature of this type is preferably present essentially along the entire line section between the injection point and/or between a central region around the injection point and the boundary of the base region towards the main body.

Preferably, the transition region or region of the transition and/or the wall of the transition (or the curve at which the base body transitions into the base region of the container) of the main body into the base region of the container, has a wall which is at least in sections and in particular over the entire circumference, (in particular in the case of a line running (exclusively) in the circumferential direction (also referred to below in particular as a circumferential line) and formed on the container or wall and/or a line formed on the container or wall, which line has at least one extension direction in the circumferential direction of the container) curved outwards (viewed from the container interior, approximately in the radial direction from the central axis of the container in the viewing direction towards the outside). Preferably, this transition (-region) has no groove (in particular extending in the longitudinal direction) and/or this transition (-region) has no region curved inwards (in particular when viewing a line running along the wall of the transition (-region) and running in the circumferential direction.

Preferably, a tangent at a point of a formed line formed on the outer wall (and/or inner wall) of the container along the longitudinal direction, in particular at each point of the region at which the base region merges into the main body, exclusively has a directional component in the longitudinal direction. The transition region preferably follows a course corresponding to the lateral surface of a cylinder.

The mouth region preferably has an external thread and/or a supporting ring. In particular, the base region has an injection point lying in particular on the central axis, and the base region preferably has a central region which surrounds this injection point, in particular is of rotationally symmetrical design. The injection point is preferably located in the longitudinal direction (when the container is upright) above the standing feet of the container.

Preferably, the standing feet or outer surfaces of these (in each case) form an in particular plane standing section of the plastic container extending in particular (exclusively) in a plane perpendicular to the longitudinal direction, preferably at least in some sections, extending over a predetermined circumferential angle.

The container preferably has a filling volume (of a beverage) of at least 0.1l, preferably at least 0.2l, preferably at least 0.3l, preferably at least 1l, preferably at least 1.5l, preferably at least 2l, preferably at least 3.5l and in particular at least 5l. The container preferably has a maximum filling volume of 5l, preferably of 3.5l, preferably of 2l, preferably of 1.5l, preferably of 1l. The container preferably has a filling volume in a range between 2l and 3.5l. The container is preferably suitable for carbonated drinks.

The base area preferably has more than three, preferably more than four, preferably more than five and particularly preferably more than seven standing feet. Preferably, the base region has less than ten, preferably less than eight, preferably less than six, and preferably less than four standing feet. The container preferably has a petaloid base.

In this case, a groove can be understood as meaning a geometric structure which extends inward (in particular for instance in the direction of the container mouth and/or the central axis) with respect to the (outer) wall of the container, that is to say for instance the (outer) wall of the base region, in particular in relation to a normal level of the circumferential wall.

Groove base is understood as meaning a (partial) region of a groove which differs from at least one further region and in particular from the remaining region of the groove and/or from a foot flank surface of a stand foot through its (uniform or common) geometric construction, such as uniform parameters of a surface parameterization and/or selection of a surface (or a common rule for the surface construction).

The term "groove base" is to be understood as meaning that (in particular contiguous) region of a groove which forms essentially the (furthest) inwardly extending (minimum) region (and the surrounding region). In this case, the groove base preferably differs from the remaining region of the groove in that it has been constructed in accordance with a different surface shape compared with the remaining region of the groove and in particular with a region of the groove which is arranged laterally on the groove base and lies between the groove base and the standing foot. Preferably, the above-described region located adjacent to the groove base and lying between the groove base and the standing foot (in its entirety) is part of a foot flank surface of a standing foot (and is in particular correspondingly constructed as such).

Preferably, the groove base extends from the injection point or a central region surrounding the latter in the radial direction towards the outside, substantially as far as (or almost up to) the main body. Preferably, the groove and/or the groove base extends over at least 75%, preferably at least 80% and particularly preferably at least 90% of the arc length of a line which starts from the injection point and/or the central region and is formed from there on the base wall in the radial direction to the outside as far as the main body.

Preferably, the groove and/or the groove base thereof extends (and in particular between two support feet in each case at least one arranged groove and/or the groove base thereof extends) in the radial direction (at least with one component). The main extension direction of the groove and/or of the groove base preferably runs substantially and in particular exactly along a radial direction in a projection of the groove or groove base on a plane perpendicular to the longitudinal axis.

Preferably, at least one and preferably exactly one groove (with a groove base extending in the circumferential direction over a (predetermined) circumferential angle) is arranged between in each case two standing feet arranged adjacently (laterally or in the circumferential direction), wherein preferably the respective groove has a main extension direction running in the radial direction (wherein in particular at least one component of the main extension direction in particular points in a radial direction).

Preferably (in each case) one groove base is arranged substantially and preferably exactly symmetrically (with respect to the circumferential direction) between two (adjacent) standing feet. A (each) groove and/or a (each) groove base is formed (axis-) symmetrically with respect to a plane which extends in the longitudinal direction of the central axis or longitudinal direction of the container and in a (radial) direction along the geometric centre (viewed in the circumferential direction) of the groove and/or of the groove base.

Preferably, a wall region of the base region is located in the geometric centre of a groove and in particular in the geometric centre of a groove base, said wall region extending furthest (in the radial direction and/or towards the central axis) into the interior of the container with respect to wall sections in the circumferential direction. In other words, in the case of a line which is formed (exclusively) along the circumferential direction and runs along the base wall (in particular along the outer surface of the base region), the line section located on the geometric centre of a groove base is closest to the central axis. This line (exclusively) running along the circumferential direction preferably has a curvature inwards in the region of the groove base and preferably in the entire region of the groove base. If a section of the base region is formed with a plane which is perpendicular to the central axis, it is curved inwards (towards the centre axis) in the region of the groove base (in particular in this entire region). Preferably, there is a inflection region in which this curvature or curvature reverses and/or whose orientation changes (exclusively) outside the groove base.

The inward curvature according to the invention of the wall of the container is preferably viewed in a region of the groove base along a (hypothetical) line in the circumferential direction. Preferably, the region of a groove base, which is curved inwards, extends at least over the predetermined circumferential angle, over which the groove base extends.

A base line is, in particular, understood, in the following, to be a geometric line formed along the base region which, in a projection along the longitudinal direction, forms a circular line about the central axis on a plane which is perpendicular to the central axis. Such a base line preferably extends from a standing foot and/or a standing area over a groove base to an adjacent standing foot and/or standing area. Preferably, the base line extends from a standing foot and/or a standing area completely to this standing foot and/or standing area over at least one groove base and preferably over all the groove bases.

The course of curvature of a base line is given at a point of the base line, in particular by the respective curvature value of the (outer) wall in a direction along the base line.

The base line preferably has no curvature and/or only a slight curvature in the region of a standing foot or in the regions of the standing feet. The base line can be curved outwards (in particular when viewed in the radial direction) in a standing region of the base region, which is arranged radially on the inside or radially on the outside (but viewed in the circumferential direction in the region of the standing foot) with respect to a standing foot. Preferably, the base line has, in a region which, viewed in the circumferential direction (directly), adjoins a standing foot and/or a standing region, an outwardly curved line profile (again when viewed in viewing direction of the radial direction). Preferably, the curvature of the base line first increases in the region adjoining (in the circumferential direction) to a standing foot and/or standing region in the direction of the adjacent groove base (preferably continuously and monotonically and particularly preferably strictly monotonically) until it reaches a maximum value and subsequently decreases the curvature (in particular continuously and preferably monotonically and particularly preferably strictly monotonically) until it reaches an inflection point and/or a inflection region at which there is no curvature of the base line or the radius of curvature is infinite and/or in that the orientation of the curvature changes.

Following this inflection point, the base line (between the inflection point and/or inflection region and the groove base) preferably has an inwardly curved (again in a radial viewing direction) line profile. Preferably, the curvature increases continuously and preferably monotonically and particularly preferably strictly monotonically in the region between the inflection point and/or the inflection region and the groove base (in particular monotonically and particularly preferably strictly monotonically) and particularly preferably reaches a maximum value in a region adjacent to the groove base (in the circumferential direction). Preferably, at least one and particularly preferably exactly one inflection point and/or an inflection region of the curvature of the ground line is preferably present between a standing foot and/or standing region (as viewed in the circumferential direction) around the adjacent groove base. In other words, the base wall preferably changes in shape in the region of the base line in such a way that the base line merges from an outwardly curved line profile close to a standing foot and/or standing area in an inwardly curved or curved line profile close to the base groove.

Preferably, a base line, which extends over a standing foot and/or a standing region, has an inwardly curved line profile in the region of the groove base. Preferably, there is no inflection point and/or inflection region of the curvature of the base line in the base line region within a groove base. Conversely, this means that the curvature of a base line in the groove base always maintains the same orientation. Preferably, in no line section of the base line, an uncurved line profile is present in a region of a groove base. Preferably, a (particularly preferably each) base line has a finite radius of curvature in the region of the groove base (preferably in the region of each groove base).

Preferably, a base line (particularly preferably each base line extending over a standing foot and/or standing area) has a variable curvature profile in the region of a (preferably each) groove base. The curve of curvature of a base line in the region of a groove base is preferably not constant. Such a non-constant and variable curve of curvature of the base line in the region of the groove base advantageously makes it possible, in order to achieve improved production of the base region of the container and in particular for achieving a better result of the blow moulding process, the form of the tensions band can be adapted to an advantageous surface shape of the tension band in the region between two standing feet and nevertheless at the same time the functionality of the tension band, such as the transmission of force from the injection point to the side wall of the container, can be preserved as far as possible.

Preferably, the course of the curvature of the base line (a base line), which preferably extends over at least one standing foot and/or a standing area, is substantially constant in the region of a (each) groove base. Although it is conceivable that the base line has regions of constant curvature in a section of the groove base, it is preferred, however, that the base line has no section with a constant curvature in the region of a groove base. This offers the advantage that the groove base, which is intended to function as a tension band, can still be brought better or closer to a hemispherical surface shape (a hemisphere has a constant radius of curvature), and nevertheless can be adapted as far as possible to the shape of the foot-flank surfaces or of the standing feet and/or the standing regions, so that during the blow-moulding process material can flow or be moved into the standing feet from a region at the groove base in a manner which is as optimal as possible.

The expression of a substantially constant curvature profile is understood in particular as meaning that the curvature value (and/or the amount of curvature) changes by not more than 30% of a (in particular minimum curvature value and/or amount of curvature), preferably not more than 20%, preferably not more than 15%, preferably not more than 10% and particularly preferably not more than 5%.

In an advantageous embodiment, at least one groove base (preferably in each case one groove base of each groove between two standing feet) has a circumferential angle which is between 2.5° and 30°, preferably between 5° and 25°, preferably between 8° and 20°, preferably between 17° and 19° and particularly preferably at 18°.

A (each) groove base preferably extends at least over a predetermined circumferential angle which is between 2.5° and 30°, preferably between 5° and 25°, preferably between 8° and 20°, preferably between 17° and 19° and particularly preferably at 18°. Preferably, the groove base extends in each case exactly over the predetermined circumferential angle. The predetermined circumferential angle for each groove base of a groove between two feet is preferably the same. Preferably, a groove base (in each case one groove base) between two standing feet substantially occupies exactly one extent in the circumferential direction, which corresponds to an angle segment over the predetermined circumferential angle. Viewed in the circumferential direction, in particular a groove base extends along its entire radial extent (that is to say the extent in the radial direction) over the (substantially exactly over the) predetermined circumferential angle.

In a further advantageous embodiment, the groove base of a (each) groove (between two adjacent feet) merges into the remaining region of the groove (and/or into a standing region) and/or into a foot flank surface (of a standing foot) in a region whose main extension direction extends (exclusively) in the radial direction on the base region wall and in particular not in the circumferential direction.

Preferably, the transition region from one groove base of one (each) groove into the remaining region of the groove and/or into a foot flank surface (of a standing foot) is given by a line formed on the base region, which extends along the base region (exclusively) in the radial direction and not in a circumferential direction.

In a further advantageous embodiment, the curvature of a line formed along the base region, preferably a base line, which extends over at least one groove base starting from a standing foot or a standing region surrounding a standing foot, changes in the groove base by less than 30%, preferably by less than 25%, preferably by less than 20% and particularly preferably by less than 15%.

In a preferred embodiment, the curvature value (and/or amount of curvature) (in particular from a view in the radial direction) of a region of the groove and/or of a section of a (in particular each) base line which extends (at least in sections) over a standing foot and/or a standing area, within a circumferential angle range (in particular a predetermined angular segment about the central axis or a region of the container base which lies within a certain angle segment about the central axis) changes by less than 30%, preferably by less than 25%, preferably by less than 20%, preferably by less than 15%, preferably by less than 10% and particularly preferably by less than 5%. In this case, this region of the groove or this section of the baseline (in particular in each case) extends in the circumferential direction over a (predetermined) angle of at least 2.5°, preferably of at least 5° and particularly preferably of at least 10°. This region or section of the base line preferably has no uncurved course (when viewed in the radial direction). This region or section of the base line preferably has a varying curvature (in particular when viewed in the radial direction) and in particular does not have a constant curvature.

Such a region preferably extends in the radial direction along the base region substantially along the entire groove base. Such a region preferably extends in the radial direction at least over the extent of the standing foot in the radial direction. Such a region preferably extends in the radial direction along the base region substantially along at least 50%, preferably at least 60% and particularly preferably 70% of a line formed in the radial direction on the base region wall starting from the injection point (or the central region) to the transition between the base region and the main body.

The curvature profile of a base line in each point within the groove base is preferably continuous and preferably differentiable, in particular can be differentiated at the geometric center of a groove base. The orientation of the curvature of the base line in the region of the base of the groove preferably remains the same.

In a further advantageous embodiment, the maximum sections of a groove base section of a base line in which the curvature values of the groove base section of the base line have (local) maximum values and/or global maximum values (relative to the groove base section) are arranged (exclusively) on the edge regions (in the circumferential direction) of the groove base.

In a further advantageous embodiment, the minimum section of a groove base section of a base line, in which its curvature values (and/or curvature amounts) have (local) minimum values and/or global minimum values (relative to the groove base section), is arranged (exclusively) in a region around the geometric centre of the groove base. The region with the minimum amount of curvature is preferably located substantially exactly at the base line point of the geometric centre of the groove base. Preferably, exactly one local minimum of the curvature values lies within the section of a base line in the groove base. Preferably, the curvature values of a curvature curve within a groove base from a groove base edge to the second groove base edge initially (preferably strictly) monotonically decrease and then rise monotonically (preferably strictly) monotonically to the second groove base edge, preferably after reaching an absolute minimum, in particular (exactly) in the geometric centre of the groove base.

In a further advantageous embodiment, the wall of the container is curved inwards at least in sections and preferably in an (in particular continuous) laterally adjacent region of a geometric centre of the groove base (again in the viewing direction in the radial direction).

In a further advantageous embodiment, the wall of the container is curved inwards at least in sections along a geometric centre of the groove base. The wall of the container is preferably curved inwards in each region (in the circumferential direction) between two adjacent feet at the geometric centre of the groove base.

The container preferably has a plurality of groove bases and/or grooves of the same shape. In particular, all grooves and/or groove bases between two feet have the same shape.

In a further advantageous embodiment, a width (measured in particular in the circumferential direction) of the groove base increases in a radial direction of the container outwards and/or with increasing radial distance from the central axis.

In a further advantageous embodiment, a (preferably each) region of the base section arranged between a standing foot and a groove base merges tangentially continuously and/or continuously in terms of curvature into the groove base. In other words, a (in particular each) region of the base section (in particular a foot flank surface) arranged adjacent to the groove base (viewed in the circumferential direction) merges tangentially continuously and/or curvature-continuously into the groove base. In this case, the tangent continuity or curvature continuity is seen in this paragraph, in particular when viewing a transition in the circumferential direction and/or along a base line and/or in a radial viewing direction. Such a tangential and/or curvature-continuous transition offers the advantage that plastic material to be distributed during a blowing process can be moved or drawn into a standing foot with as little friction as possible, caused by the geometric shape (of the corresponding blow mould), for example from the groove base (along the foot flank surfaces).

In a further advantageous embodiment, at least one line (or formed) running in the radial direction, running on the surface and running (at least in sections) through a groove base, has a inflection region, in which a surface region of the base section changes the orientation of its curvature and, in particular, is transferred from an outwardly curved region (in particular when viewing a course of curvature of a base line and/or a course of curvature of a line running in the circumferential direction; in particular when viewed from the radial direction) into an inwardly curved region.

In other words, the base region preferably has a first region and a second region which are at least partially and preferably completely different from one another and of which the second region is arranged closer to the base centre point and/or the injection point and/or closer to the central axis of the container in relation to the arrangement of the first region, wherein the first region is arranged at least in sections (and preferably in its entirety) between the second region and the main body between (corresponding to the radial direction along the container wall). Preferably, the first and second regions differ from one another (in particular over the entire surface) by their curvature along at least one direction and preferably in exactly one direction (preferably along a base line and/or a line following the circumferential direction and formed along/on the container wall).

Preferably, the first region has a curvature towards the outside, whereas the second region preferably has a curvature towards the inside. Preferably, both the first region and the second region are arranged at the geometric centre of a groove and/or of a groove base.

Preferably, an inflection region is arranged between the first region and the second region between the first region and the second region (in particular in accordance with the radial direction along the container wall), in which inflection region the curvature reverses and in particular changes the curvature of the region from an inward curvature into a curvature towards outwards. In particular, the inflection area can also be a point-shaped area (inflection point).

In a further advantageous embodiment, a groove base cross-sectional contour or a tension band cross-sectional contour follows, at least in sections and preferably substantially completely, a spline of the n-th degree in the case of a cross-section along the longitudinal direction of the container (through a base region of the container). The degree is preferably selected between degree 2 and degree 7.

In a further advantageous embodiment, a groove basic cross-sectional contour or tension band cross-sectional contour follows along the geometric center of a (each) groove base or (each) tension band at least in sections and preferably substantially completely (at least and preferably exactly) with a spline of the n th degree. The degree is preferably selected between degree 2 and degree 7.

In a further advantageous embodiment, a section, which can be described by a spline, of one and preferably each groove base, which runs in particular in a plane extending in the longitudinal direction and in the radial direction, merges tangential-continuously and/or curvature-continuously into a preferably rectilinear section of the base region adjoining the spline. The section of one and preferably each groove base, which can be described by the spline, preferably merges tangential-continuously and/or curvature-continuously at each of its two end points into a section of the base region and/or main body adjoining the spline, preferably straight or curved.

Preferably, a base contour of the base area of the container is in the region of one (each) groove base or tension band and in particular is a cross-sectional contour of the base region (with a cross-section along the longitudinal axis of the container) in the region of the groove base and in particular along the geometric center of the groove base, in such a way that it preferably first has a main body connection section, which is preferably designed as a rectilinear or curved section (in particular in a region which adjoins the main body) at which (at least and preferably exactly) a spline of the nth degree (where n is preferably selected is between (including) 2 and (including) 7). Preferably, a centre point transition section adjoins the spline, said centre point transition section extending in particular from a geometric centre point of the container and/or an injection point and/or a central section. Preferably, the base body connection section and/or the center point transition section of this base contour (in each case) occupies less than 20%, preferably less than 10% and particularly preferably less than 5% of the arc length of the basic contour.

Preferably, the n-th degree spline transitions tangentially-continuously and particularly preferably curvature-continuously into the base body of the container and/or into the base body connection section. A tangent value of the spline is at a transition region and/or transition point between the spline and the main body of the container and/or the main body connection section preferably selected from a range between 0.1 and 2.5, wherein in particular this value represents an amount of the tangent vector and is preferably specified as a percentage of the tangential.

Preferably, the spline of n-th degree transitions tangential-continuously and particularly preferably curvature-continuously into the center point transition section and/or the central section of the container and/or the injection point. A tangent value of the spline is at a transition region and/or transition point between the spline and the centre point transition section and/or the central section of the container and or the injection point preferably selected from a range between 0.1 and 2.5, wherein in particular this value represents an amount of the tangent vector and is preferably specified as a percentage of the tangential.

Preferably, the basic contour has at least and preferably exactly one curvature-continuous transition of the spline into a section adjoining the spline, and preferably the base contour has at least and preferably exactly one tangentially-continuous transition of the spline into a section adjoining the spline. The first adjoining section can be, for example, the central point transition section and/or the central region and/or the injection point, or it can, however, be the main body connection section or the main body. The second adjoining section can be, for example, the main body connection section or the main body, or it can be the centre point transition section and/or the central region and/or the injection point.

The basic contour preferably has a spline or can be described by a spline (at least in sections), which is connected to at least one adjoining section with a conical transition control. Such a conical transition control of the spline is usually characterized by a value Rho, which is preferably between 0.01 and 0.99. In particular, a small Rho value produces a flat cone while a large Rho value produces a sharper cone.

In a further advantageous embodiment, the groove base follows, at least in sections (preferably at least the region of the groove base arranged between two feet as viewed in the circumferential direction) and, in particular, substantially along its entire extent in the radial direction, a circular-sphere-like course. Preferably, the base region between each two (adjacent) standing feet has a region (extending substantially from a central region and/or injection point to the main body of the container) which has a circular sphere (segment)-like course. This offers the advantage that, in the case of a surface profile of the wall approximated (largely) to a circular ball (segment), the advantageous geometric properties of a circular ball (segment)-shaped wall can be largely retained with respect to the force transmission.

Preferably, the groove base deviates at least in sections and in particular in a (each) region between two feet (as viewed in the circumferential direction) from a (substantially) exactly hemispherical (-segmental)-shaped wall section or profile. In other words, preferably no region of the groove base follows a strictly geometric hemispherical (segment)-shaped course.

A hemispherical shape of a region is understood in particular as meaning that this region does not deviate more than 20%, preferably not more than 10%, preferably not more than 5% and particularly preferably not more than 2.5% of a spherical radius from a sphere approximated to the region (in particular in the radial direction with respect to the center of the sphere of the approximated sphere).

Preferably, the groove base can be described at least in sections, preferably a section of the groove base selected (in particular in its entire extent in the circumferential direction) between two feet and particularly preferably in its entirety between two (hypothetical) circular sphere surfaces, the sphere radii of which differ from one another by less than 20%, preferably less than 10%, preferably less than 5% and particularly preferably less than 2.5%.

Preferably, a line formed along the geometric centre between two adjacent standing feet and/or the geometric centre of the groove and/or the geometric centre of the groove base on the wall deviates from a circular arc (at each point of the line formed) approximated thereto by less than 20%, preferably less than 10%, preferably less than 5% and particularly preferably less than 2.5% of the circular radius of the approximated circular line with respect to a geometric distance of this formed line from the approximated circular line. The line formed preferably takes over more than 20%, preferably more than 30%, preferably more than 40%, preferably more than 50%, preferably more than 60%, preferably more than 70%, preferably more than 80% and particularly preferably more than 85% of the arc length of a connecting line formed on the wall, by geometric centre between two adjacent feet and or by the geometric centre of the groove and/or of the groove base, between, on the one hand, the base centre point and/or the injection point and, on the other hand, the transition of the base region into the main body. Preferably, this formed line (at least in sections and preferably in a range of more than 85% of the arc length) can be described by a spline of the n-th degree. However, it is also conceivable that this formed line can be described by a circular line.

In a further advantageous embodiment, the groove base (or the tension band) is not a surface which is rotationally symmetrical about the central axis of the container (in particular in its entirety and preferably also not at least in some sections). This distinguishes the construction of the groove base from that of a groove base known from the prior art, in which the basic contour is rotated about a central axis over a tension band angle at both ends of an angle segment. A deviation from a rotationally symmetrical surface section offers the advantage that it is possible to adapt to the curve profile (in particular also with regard to the curvature) while at the same time largely hemispherical-segment-shaped form.

Preferably, the groove base is designed as a free-form surface which is connected to the surface edges of a foot-flank surface or of a transition region, which is arranged laterally to a standing foot, and to the main body of the container and to a central region around an injection point or to the injection point, in particular in a tangent-continuous and in particular curvature-continuous manner. The course of curvature of the free-form surface of the groove base in a (each) predetermined direction can be described by polynomials of the nth degree.

Preferably, at least one, preferably at least two, preferably at least three, parameters characteristic of the free-form surface of the groove base are selected and/or determined in such a way that the free-form surface is approximated in its geometric shape to a region of a spherical surface and in particular is formed in the manner of a hemisphere (segment).

In a further advantageous embodiment, the container base has a substantially constant wall thickness at least in sections and preferably over the entire surface. In particular, a wall thickness in the region of a standing foot and the region of a groove base is substantially the same size. Thus, the highest possible stability of the container or container base can be achieved with the least possible use of material.

Preferably, the container base is axially symmetrical with respect to the central axis.

Preferably, a basic contour of the base region of the container can be described in a region of a standing foot by a basic contour in this foot region, which preferably initially has a straight section (in particular starting from a geometric centre point of the container and/or an injection point and/or a central section) to which a spline or curved section adjoins.

Adjoining this curved section is preferably a further curved section or spline, and preferably a further curved section with which the base region merges into the main body. The foot surface, in particular the standing foot and/or the standing area, is produced from this basic contour by a rotation of the base animal about the central axis of the container selected as the axis of rotation. Reference is made explicitly to the patent application DE 10 2013 110 139 A1 of the applicant, in which a preferred geometry of the base area of the base area (base section) is described (and illustrated in FIGS. 2 and 3). All the features described in this application with respect to the region of the base (and its course of curvature) are to be regarded as disclosed herein by reference.

Preferably, the region arranged laterally adjacent to the groove base (viewed in the circumferential direction) is a foot flank surface of a standing foot of the container. The foot flank surface is preferably designed as a free-form surface, which is preferably connected to the surface edges of the standing foot and/or of a foot region and, in particular, to the surface edges of the main body (and in particular a central region and/or an injection point), in particular in a tangent-continuous and preferably curvature-continuous manner. The free-form surface is, in particular, a surface whose course of curvature can be described in one (each) direction by polynomials of the n-th degree.

The foot flank surface is preferably designed as a free-form surface and, in particular, a cutout of a free-form surface, which is connected to the surface edges of an imaginary (or hypothetical) rotationally symmetrical tension band surface (or groove base) in particular in a tangential-continuous and preferably curvature-continuous manner. This offers the advantage that the geometric shape of the foot region of the container base can be maintained from the prior art.

The present invention is furthermore directed to a blow-moulding device for producing plastic containers with an inner wall, against which a plastic container can be expanded in the course of a blow-moulding process.

According to the invention, the inner wall has a contour which is suitable and intended to produce a plastic container, wherein the plastic container can be designed solely or in combination with all the features described above with respect to the plastic container. In particular, the blow-moulding device has a base part which is suitable and intended to produce a base region of the type described above.

The present invention is further directed to a method for shaping a plastic container from a plastic preform in a blow moulding device, which is in particular the blow moulding device described above (corresponding to a disclosed embodiment), comprising the steps:

preliminary blowing by acting upon the plastic preform with a first pressure
intermediate blowing of the plastic preform with a second pressure which is higher than the first pressure
final-blowing the plastic preform at a third pressure which is higher than the second pressure, wherein this third pressure is between 13 bar and 24 bar according to the invention.

The use of the base part according to the invention offers the advantage that a lower final blow pressure is sufficient to produce the final shape of the plastic container.

In a further preferred method, the plastic containers are relieved after the final-blowing or, in turn, air is discharged from the containers. Preferably, the final-blow pressure is maintained for a predetermined period of time.

Preferably, after the final-blowing, the pressure level is lowered at least temporarily to an intermediate blowing pressure. The first pressure or the pre-blowing pressure is advantageously between 2 bar and 15 bar, preferably between 4 bar and 12 bar and particularly preferably between 4 bar and 10 bar. The second pressure, ie the intermediate blowing pressure, is advantageously between 8 bar and 40 bar, preferably between 12 bar and 20 bar. The third pressure is advantageously between 13 bar and 24 bar, preferably between 15 bar and 24 bar, preferably between 20 bar and 24 bar and particularly preferably below 22 bar. This offers the advantage that the blowing pressure can be substantially reduced compared to the values from the prior art and thus a substantial saving of energy can be achieved.

In a further preferred method, the second pressure or the intermediate blowing pressure can be varied in a pressure range which is between 3 bar and 20 bar, preferably between 5 bar and 15 bar.

BRIEF DESCRIPTION OF THE DRAWING

Further advantages and embodiments will become apparent from the accompanying drawings Therein.

In each case a comparison of the tension band or groove base of the plastic container according to the embodiment of the prior art with a tension band or groove base according to the embodiment of a plastic container according to the invention;

FIGS. 16, 17, 27 and 28

Figure 14:
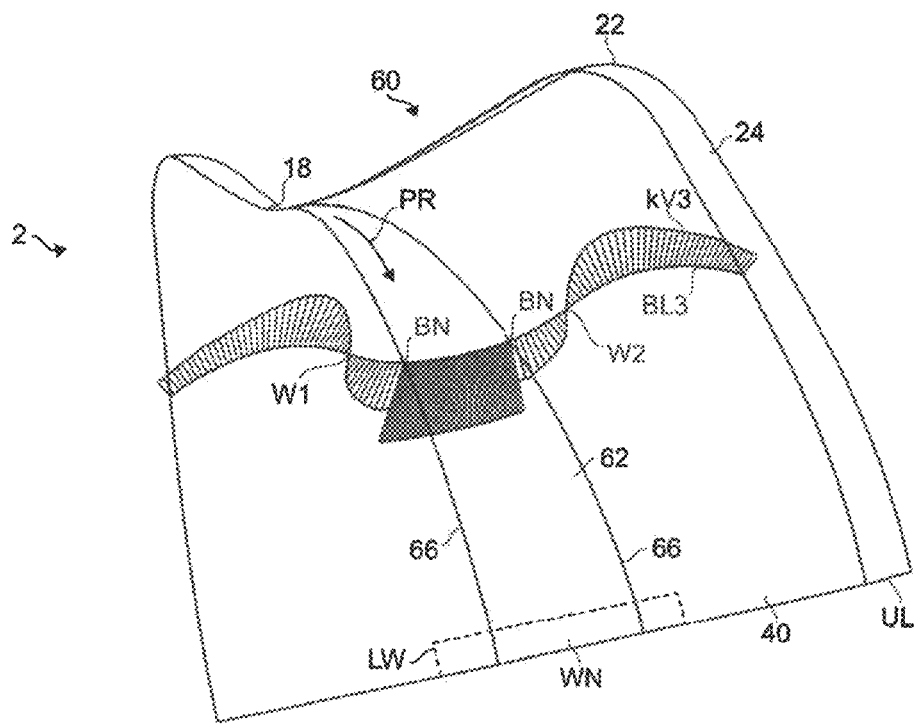
Figure 15:
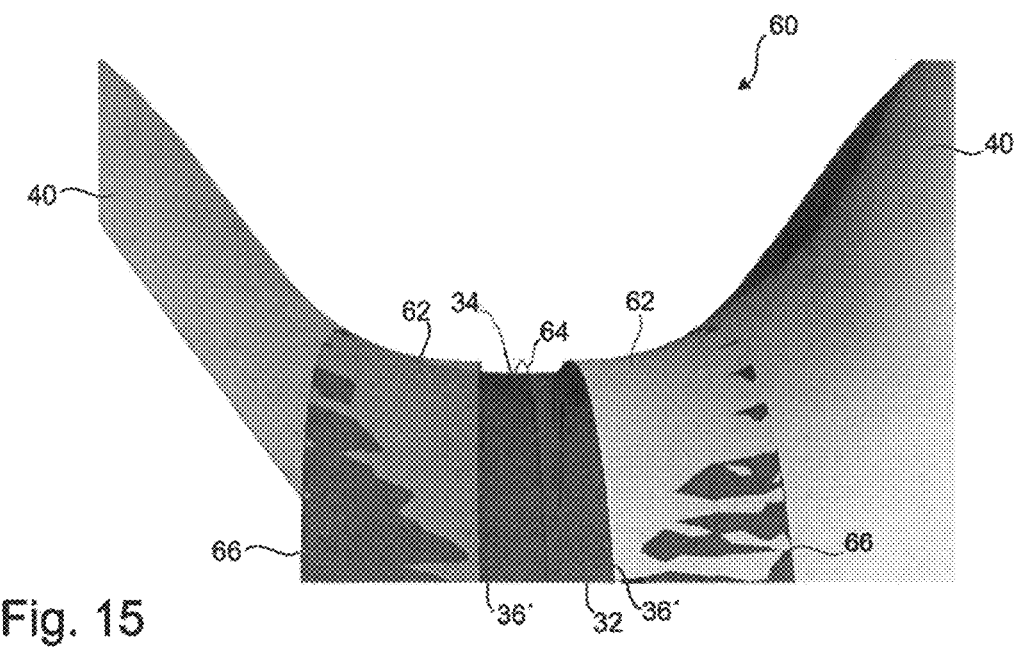
Figure 24:
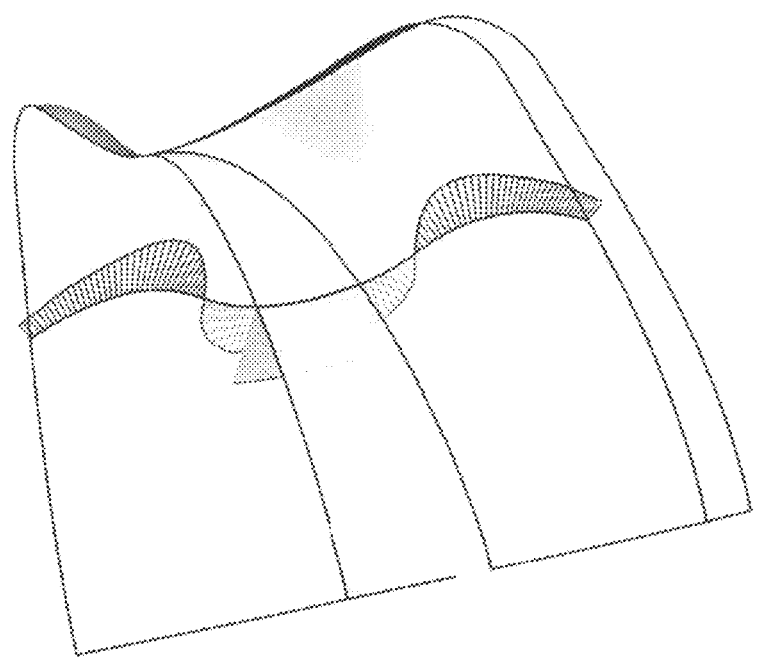
Figure 25:
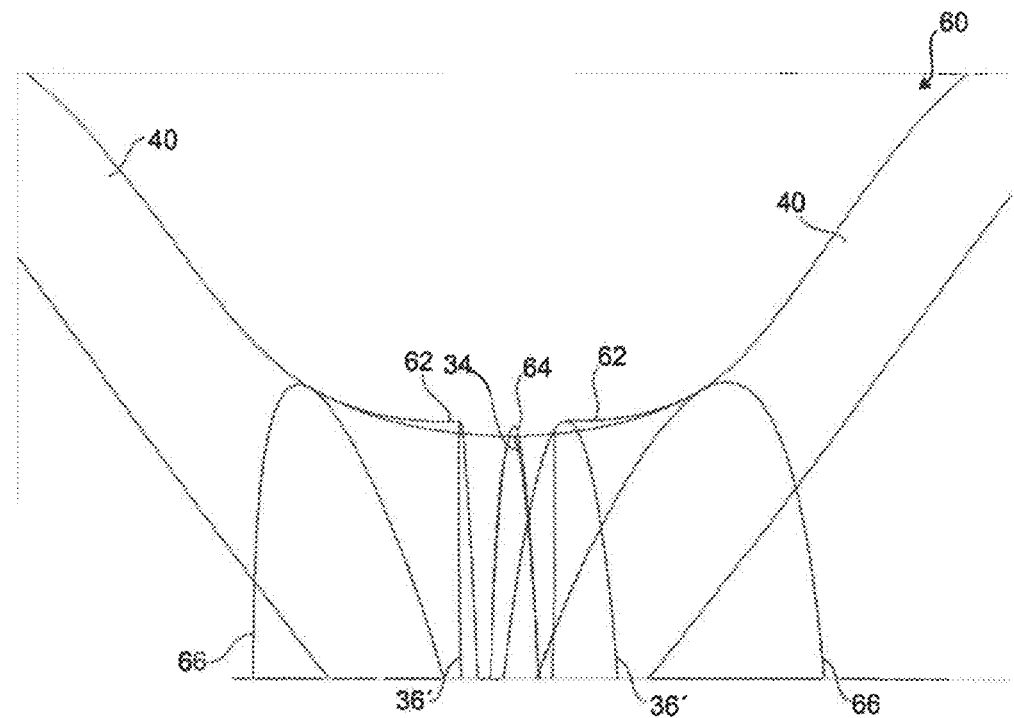
Figure 26:
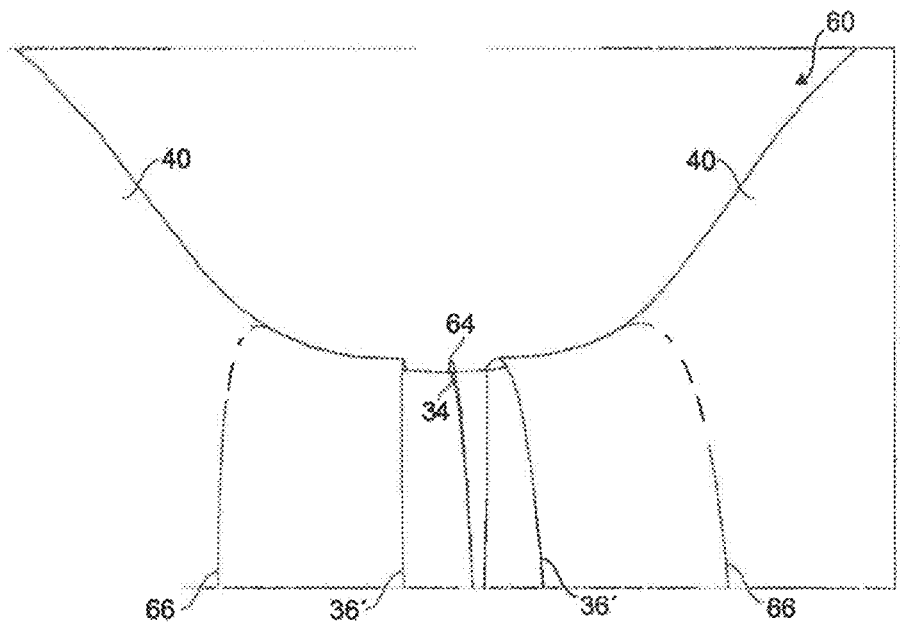

In each case a base region according to the embodiment of a plastic container according to the invention with a tension band or groove base of the plastic container according to the embodiment of the prior art;

FIG. 14 shows a course of curvature of a base line, which is formed on the base region according to the embodiment of a plastic container according to the invention;

FIGS. 15, 25 and 26 each show a further comparison of the tension band or groove base of the plastic container according to the embodiment of the prior art and of the tension band or groove base according to the embodiment of a plastic container according to the invention;

FIG. 24 shows the base section of FIG. 14 with surface shading;

FIG. 18

Figure 19:
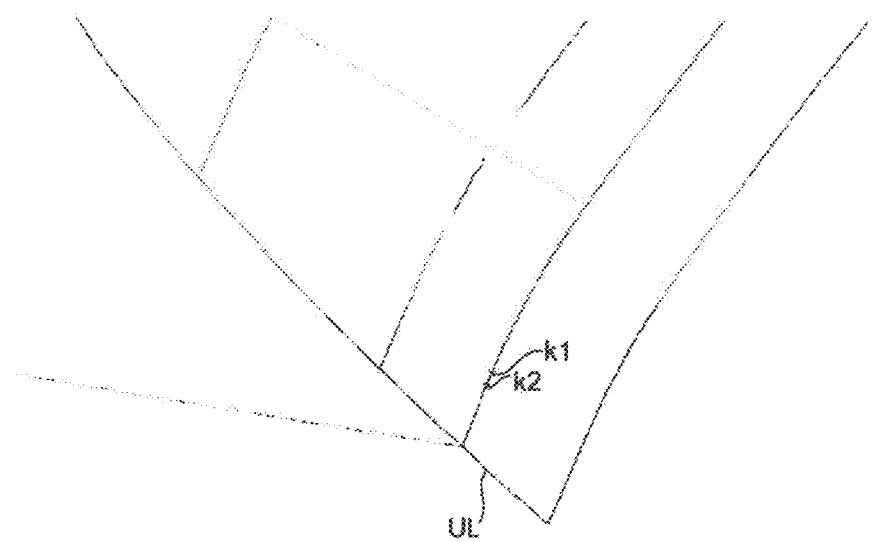
Figure 29:
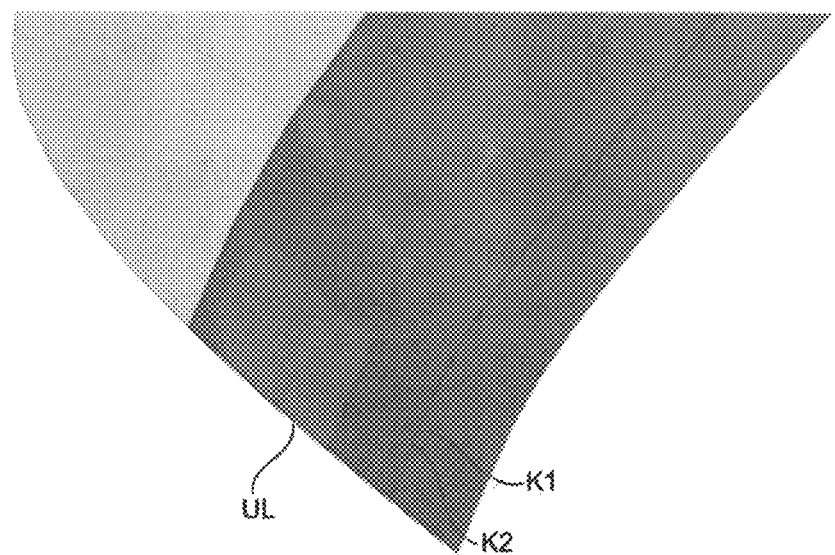

Is a section of a base portion of a preferred embodiment of the present invention;

FIGS. 19 and 29 are an enlarged view of a portion of a base portion of a preferred embodiment of the present invention;

FIG. 29 shows a comparison of a contour line KL2 of a groove region according to a preferred embodiment according to the invention of a groove region of a container with a contour line KL1 of a groove base of a container from the prior art.

Figure 30:
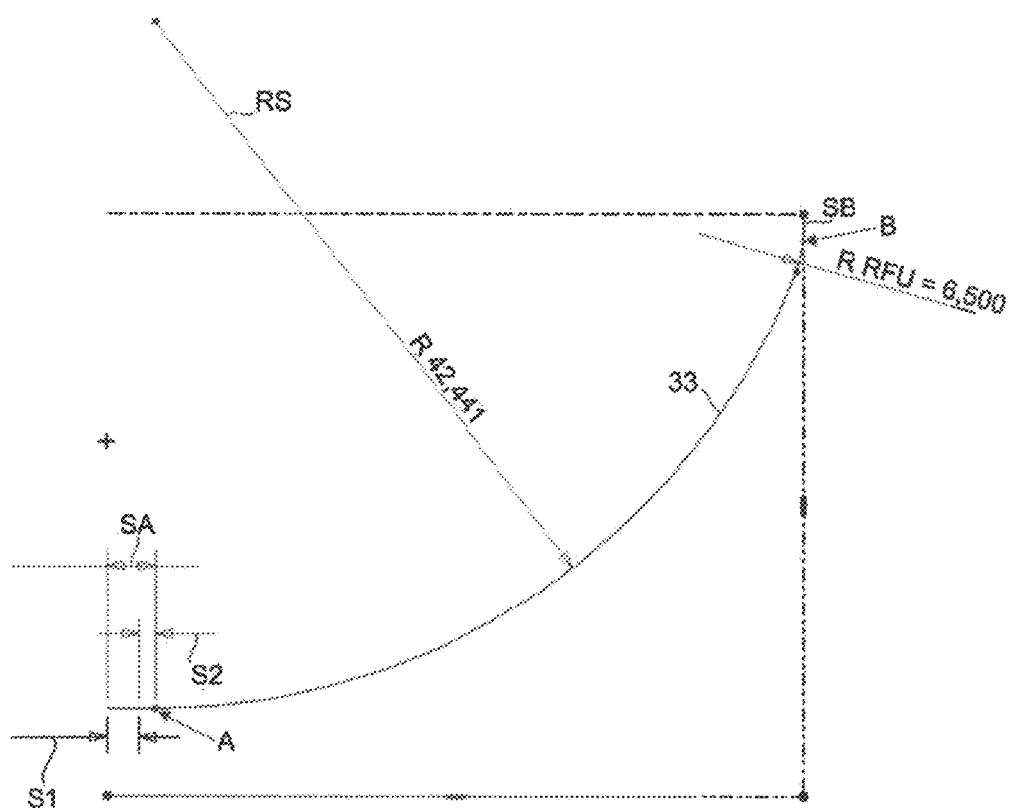
Figure 31:
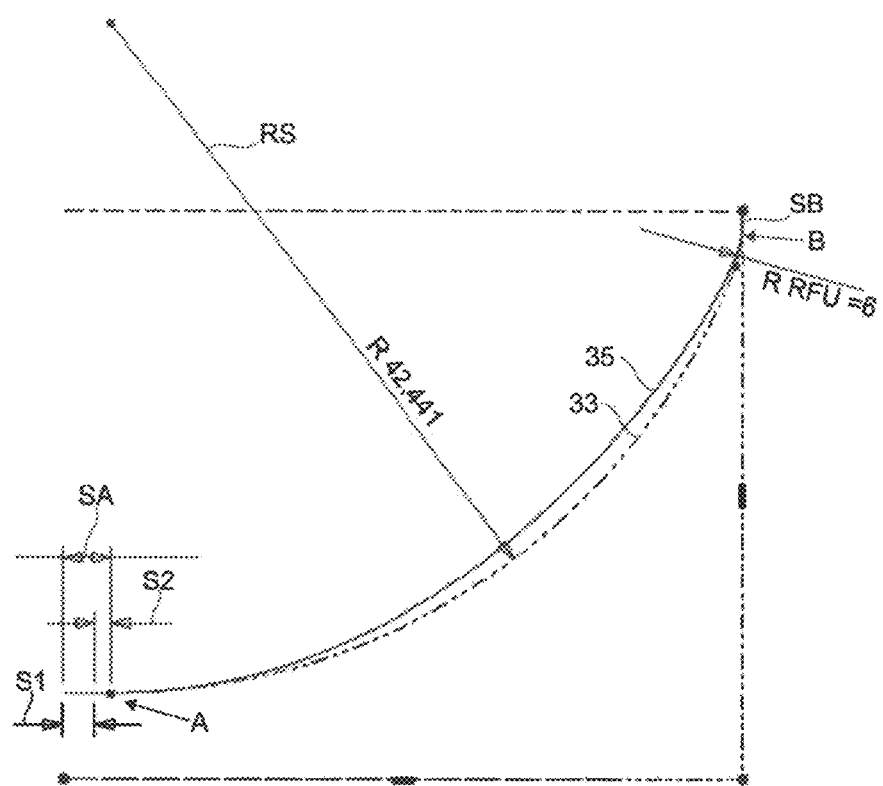

FIG. 30 shows a preferred embodiment of the tension band or groove base of a plastic container according to the invention; and FIG. 31 shows a further preferred embodiment of the tension band or groove base of a plastic container according to the invention.

Detailed Description of the Invention

Figure 1:
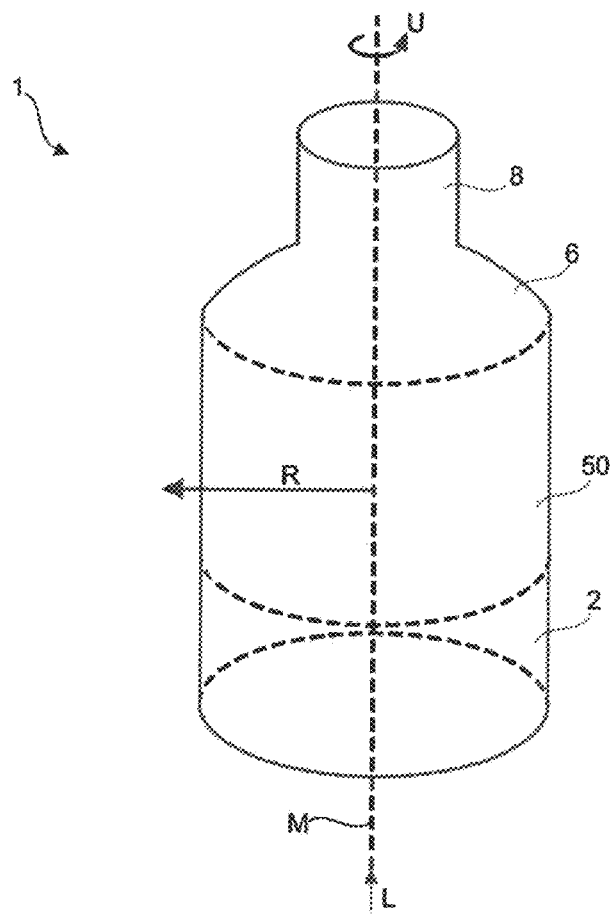
FIG. 1 is a schematic illustration of a plastic container.

FIG. 1 shows a schematic representation of a plastic container 1. This plastic container has a mouth region 6 with container mouth 8 and a main body 4 adjoining the mouth region 6. The main body 4 serves to accommodate the essential filling volume. The main body can also be designed differently in its shape than shown in FIG. 1 and can, for example, have waves or patterns. The mouth region 6 can have an external thread of the plastic container 1 and a support ring located on the container mouth 8. The container according to the invention also preferably has an external thread and a supporting ring.

The reference symbol L indicates a longitudinal direction of the plastic container 1. As illustrated, here, the longitudinal direction L is a direction along the central axis N of the container. In addition, FIG. 1 shows a circumferential direction U, which is a direction of rotation about the central axis or the longitudinal direction L as the axis of rotation.

The main body 4 is adjoined by a base region 2 of the plastic container, wherein the main body 4 can transition into the base region 2 via a curved section or else via a non-curved section.

Reference numeral 22 designates a standing foot (not shown here) of the container. The base region 2 may have a plurality of standing feet 22 with which it can stand upright on a straight surface. The reference symbol R refers to a radial direction with respect to the central axis M or the longitudinal direction L of the plastic container. In this case, the radial direction R is perpendicular to the central axis N and the longitudinal direction L and runs either towards or away from the latter. The reference numeral 50 designates a side wall of the main body 4. This side wall 50 extends over the entire circumference in the circumferential direction U of the container.

Figure 2:
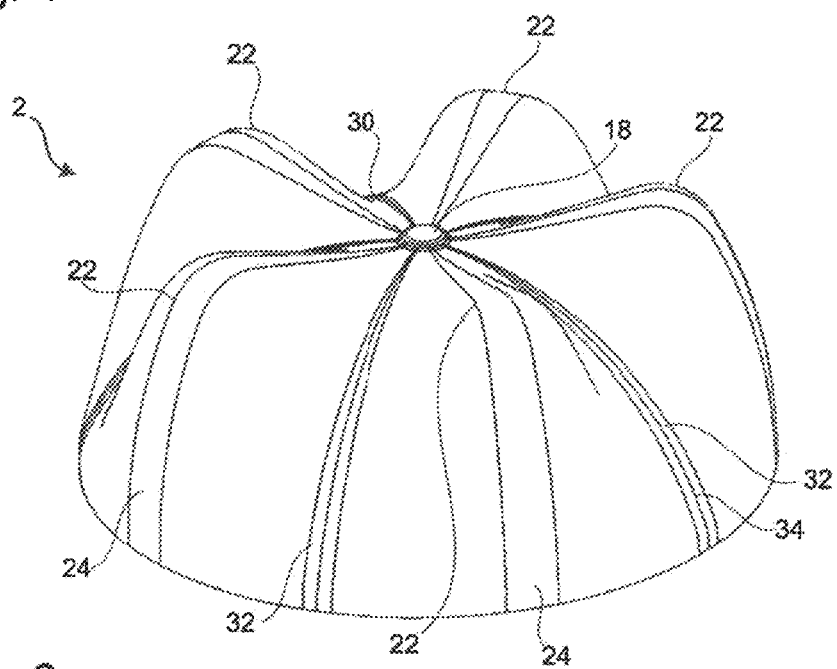
FIGS. 2, 3 and 6 are different illustrations of a base portion of a plastic container according to one embodiment of the prior art.
Figure 3:
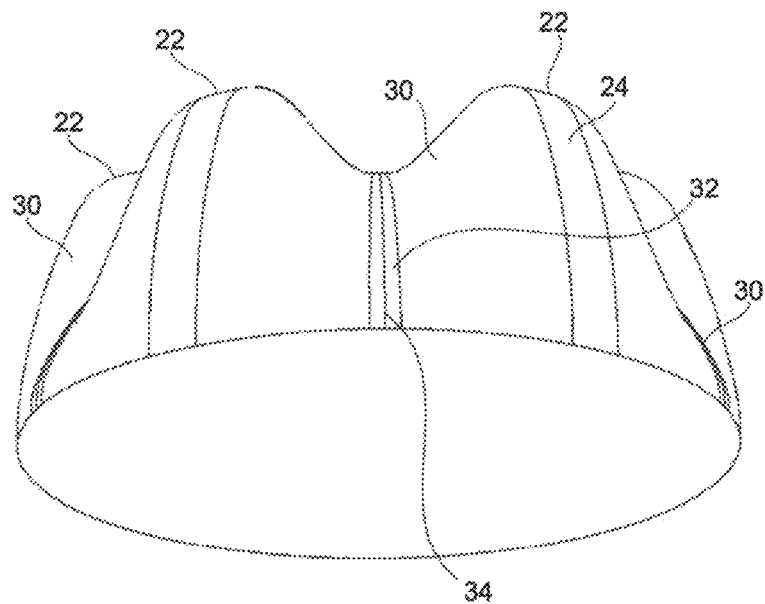

The two FIGS. 2 and 3 each show an illustration of the base region 2 in a different perspective view. This is a base section known from the prior art. There are five standing feet 22 on which the container can stand. The reference numeral 24 designates in each case a region of the base region 2 which extends radially outwards from the centre axis M from the centre axis M and in each case encloses a (exactly one) standing foot 22. In this case, the standing area 24 preferably does not extend beyond the standing foot 22 when viewed in the circumferential direction U. The standing region 24 is preferably an region of the base region 2, which is defined by a predetermined angular segment in relation to a rotation in the circumferential direction U about the center axis M as the axis of rotation.

Viewed in the radial direction, the standing regions 24 run together in the direction of the central axis M and meet in the injection point 18 of the container. In an orientation of the container standing on a plane, the injection point 18 does not touch this plane. Viewed in the longitudinal direction L, the injection point 18 is thus located above the standing feet 22, that is to say closer to the mouth region than in each case the standing feet 22.

A groove 30 is formed between in each case two adjacent feet. In this case, a groove can be understood as meaning a geometric structure which extends inwards with respect to the circumferential wall, that is to say approximately the wall of the base region.

The reference numeral 32 designates the groove base of a groove. The groove base 32 is a region around the geometric centre 34 of a groove. This is a region which essentially follows a hemispherical course in the embodiment of a container according to the prior art shown in FIG. 2 and FIG. 3. Individual formed lines formed in the radial direction at the injection point 18 toward the outside or toward the side wall or toward the main body, on the base region 2 of the groove base 32, are similar to or follow a circular course. Such a selection of the geometric curve of the groove base 32 has proven to be advantageous in particular with regard to a force transmission of a force acting on the injection point against the longitudinal direction on a side wall of the main body 4.

Figure 4:
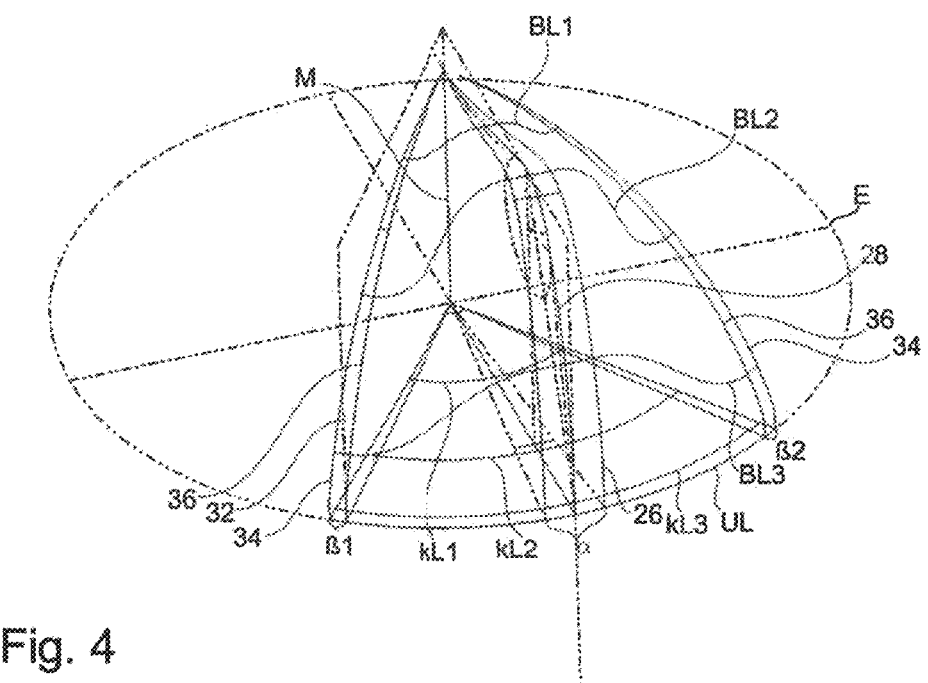
FIGS. 4, 5, 7 and 8 each show a different representation of a section of the base region of the plastic container according to the embodiment of the prior art (according to FIGS. 2, 3.
Figure 8:
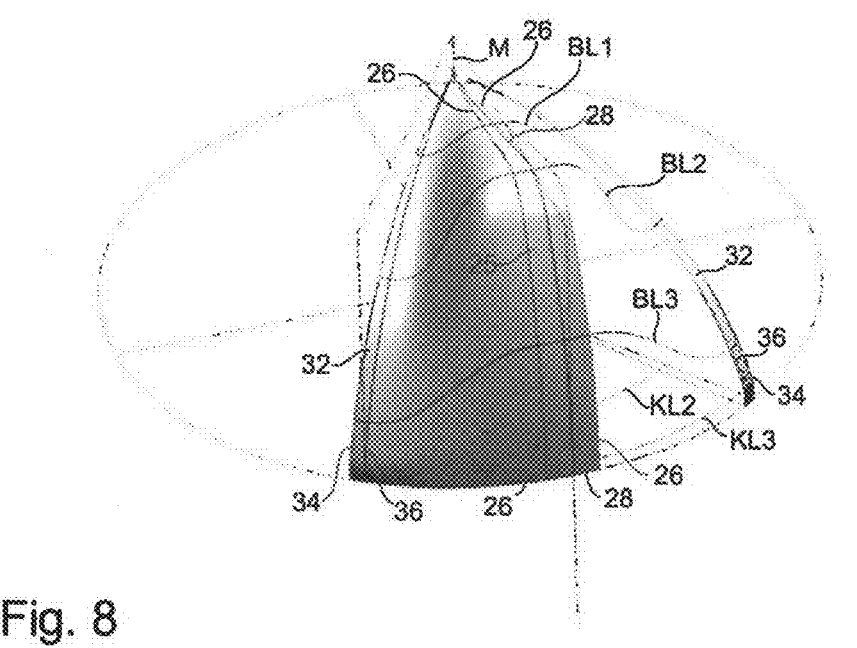

The two FIGS. 4 and 8 show a line representation (FIG. 4) or illustrate (FIG. 8) a section of the base region 2 which corresponds to an angle segment at the geometric center 34 of a first groove 32 to the geometric center 34 of an adjacent second groove 32. Only one half of each groove 32 is shown. In addition to the geometric center 32, a boundary line is shown as a further line 36, which delimits the groove base 32 with respect to a region of the base region 2 of the groove 30 arranged laterally thereon. The groove base 32 of a base region 2 of the prior art is designed, for example, in such a way that approximately the boundary line 36 is rotated about the central axis M in the circumferential direction (or counter to the circumferential direction) by an angle β1+β2. The two angles β1 and β2 are the same.

In a similar manner, a standing region 24 of a base region 2 of a container according to the prior art and in particular also according to a base region 2 of a plastic container 1 according to the invention is advantageously constructed. For this purpose, for example, a predetermined line profile 26 is rotated about the centre axis M by an angle α in or against the circumferential direction U.

In addition, the two FIGS. 4 and 8 show base lines BL1, BL2 and BL3 which run on the outer surface of the container base and are each formed in such a way that a projection of these base lines in each case along the longitudinal direction onto a plane perpendicular to the central axis M follows a circular line. The curve course KL1 to KL3 corresponding in each case to a projection of the ground lines BL1 to BL3 in the plane E therefore follows a circular course, as can be seen in FIG. 4. It can be seen from FIGS. 4 and 8 that the base lines BL1, BL2 and BL3 each have no curvature in the region of the standing region 24 (when viewed in the radial direction). In other words, the base lines BL1, BL2 and BL3 extend within the standing region 24, here as a circular line in a plane which is (for example) perpendicular to the longitudinal axis or the central axis.

Similarly, the base lines BL1, BL2 and BL3 in the area of the groove base 32 are each uncurved (or even have a straight course) or only slightly curved. The base lines BL1, BL2 and BL3 here likewise run in the respective standing regions 24 as a circular line in a plane which is perpendicular to the central axis or a longitudinal direction L.

The two FIGS. 5 and 7 again illustrate a construction of the standing regions 24 and of the groove base 32 of a container according to the prior art. In this case, the two FIGS. 5 and 7 each show an illustration of two cutouts of the container base. Only one standing region 24 and one half of a groove base 32 are shown here. The groove base 32 is shown only up to its geometric centre 34. Also shown for illustration of the construction is a hypothetical or imaginary plane E, which is perpendicular to the central axis M. The hypothetical or imaginary plane E, which is perpendicular to the center axis M, is illustrated by an ellipse in FIGS. 4, 5, 7 and 8. The planes E shown therein are that plane which is perpendicular to the central axis M and delimits the base region 2 from the main body 4.

Figure 5:
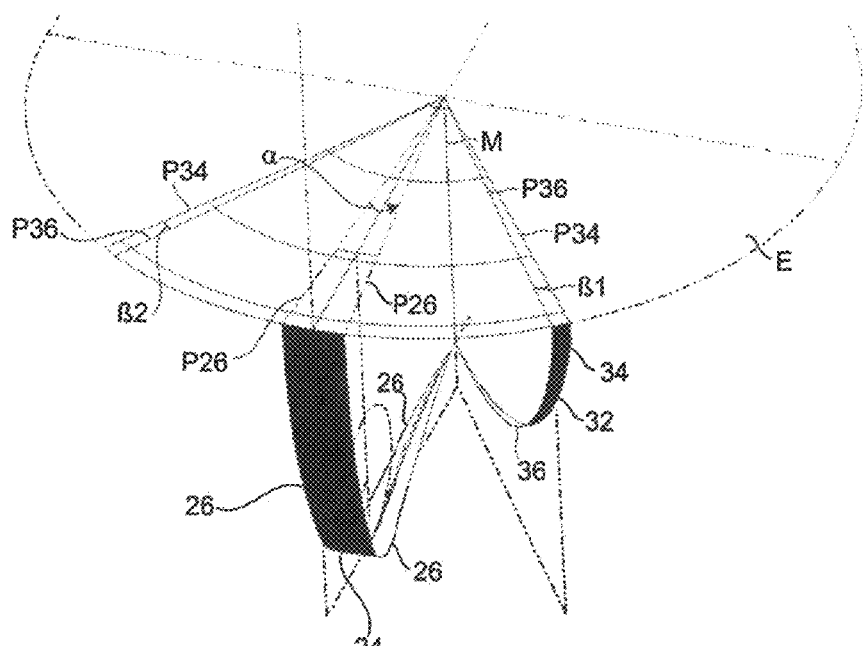
Figure 7:
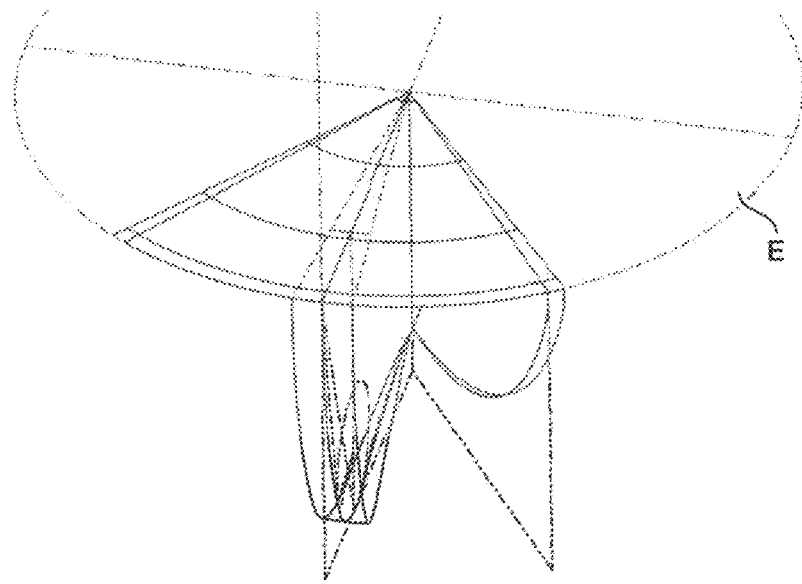

Illustrated in both FIGS. 5 and 7 are projections of the boundary lines 26 on the plane E, which leads to the two straight lines P26, each of which runs in the radial direction toward the centre axis M. Likewise, the projections of the boundary line 36 of the groove base 32 as well as the geometric centre 34 of the groove base 32 in their projection onto the plane E also result in a rectilinear straight line running in the radial direction onto the centre axis M. These two projected lines are identified by reference numerals P36 and P34. It can be seen that the two lines P36 and P34 enclose the angle β1. A complete groove base corresponds to an angular segment which extends over a double angle β. The two projected lines P26 enclose an angle α. This shows that the standing area 24 corresponds to a container base cutout which corresponds to an angle segment which extends over the angle β. In this case, the angle segments are obtained by rotations by a specific angle with respect to the central axis M or the longitudinal direction L in the circumferential direction.

In the case of the prior art container base 2 illustrated in FIGS. 2-8, the groove base 32 (in each case) functions as a tension band which intercepts approximately loads, in particular also in the direction of this tension band.

As shown in FIG. 5, in the case of the container base 2 of the prior art, the tension band is a segment (of the container base) which is rotated by an angle X.

Figure 6:
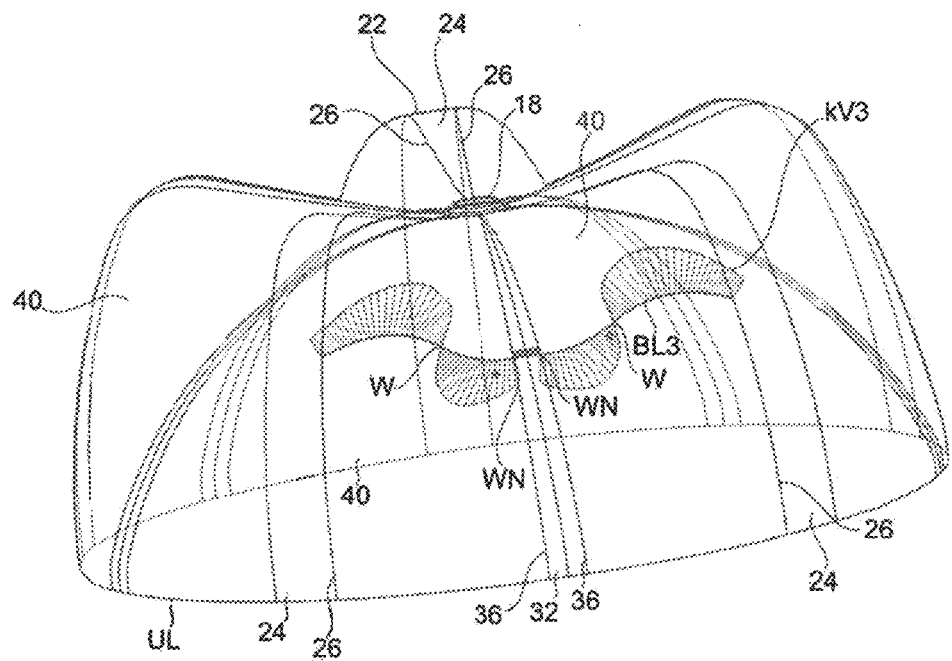

FIG. 6 illustrates a further illustration of a prior art container base 2. The five standing feet as well as the respective associated standing areas 24, which are delimited by the lines 26, are again recognizable. The boundary lines 26 extend from the injection point 18 in the radial direction toward the outside toward a side wall of the base body in a centre point of the container base. In turn, a base line BL3 is shown starting from a boundary line 26 of a standing area 24 over a groove base 32 as far as a boundary line 26 of an adjacent standing area 24.

A course of curvature of the surface wall along the base line BL3 is drawn around this base line BL3 with KV3. It can be seen that the base line BL3 has a changing curvature starting from the boundary line 26 and the orientation or orientation of the curvature in the area adjoining the standing area 24 reverses to the inflection point W and then the curvature initially increases, reaches a maximum and steadily decreases again up to the boundary line 36 of the groove base 32. The course of curvature of the base line BL3 is represented here by the gray bar in the region of the groove base 32. In any case, however, the base line BL3 in the groove base 32 does not have a varying curvature.

The reference numeral 40 designates a foot flank surface which (viewed in the circumferential direction) is arranged between a standing region 24 and/or a standing foot 22 on the one hand and the groove base 32 or the tension band 32. As shown in FIG. 6, a base line (such as BL3) of the prior art base has a constant course of curvature in the area of the tension band 32.

In FIG. 8, reference numeral 25 designates the foot geometry (of the standing foot or standing area). The two reference symbols 32 in turn characterize the two tension bands of the prior art base shown in FIG. 8.

Figure 9:
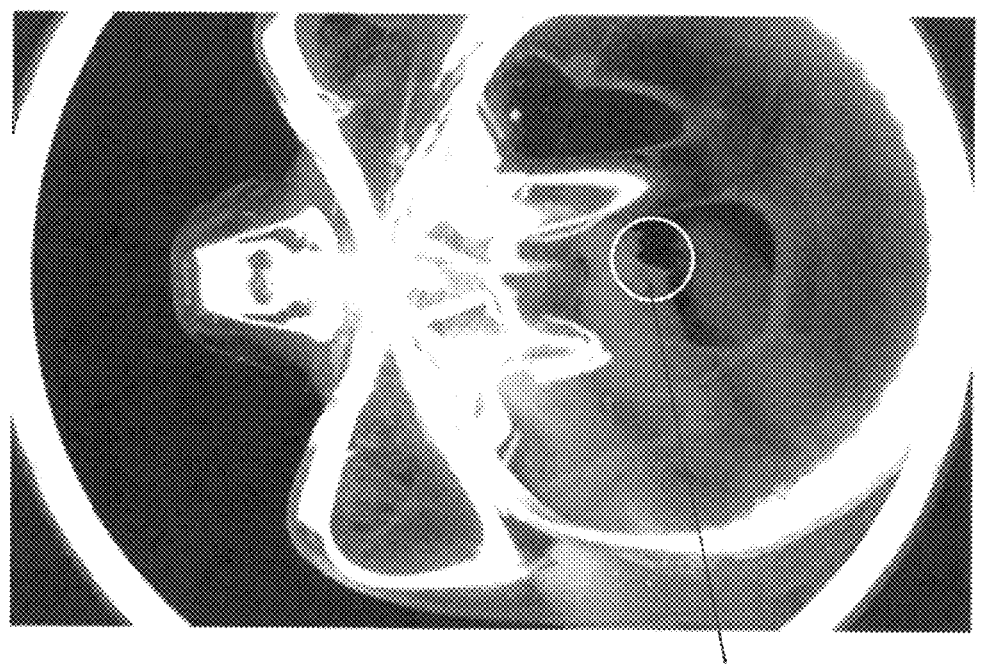
FIG. 9 shows a measurement result of the material distribution on a container base of the plastic container according to the embodiment of the prior art.

FIG. 9 shows a measurement result of the material distribution on a container base of the plastic container according to the embodiment of the prior art. The encircled region characterizes a region of the tension band at the base of the plastic container after the PET material has been blown with blowing pressure to a (blowing) form by means of a blowing process. In the embodiment of the predetermined blow mould or predetermined shape of the plastic container of the prior art which is to be achieved or produced, too much material remains suspended on the draw band of the base and cools very quickly so that the material can no longer be properly stretched.

In this case, unattractive material accumulations occur on the tension band, which are characterized in FIG. 9 by the circle 100 drawn in. These (unattractive) material accumulations reduce on the one hand the optics of the (ready-blown) plastic container, but on the other hand also reduce the soil performance in the form of wall thickness, bursting test, thermal test and stress-crack result, for example at 0.21 to 51 (filling) volumes.

Figure 10:
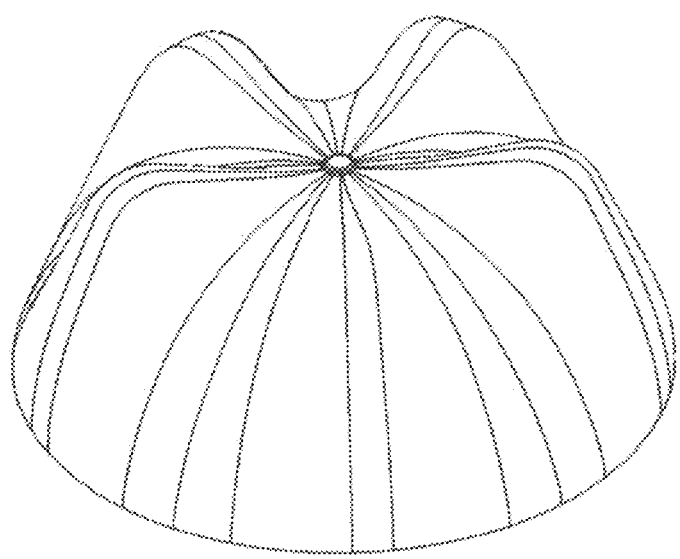
FIGS. 10 and 11 each show an illustration from different perspective of a base region of a plastic container according to the invention, according to one embodiment.
Figure 11:
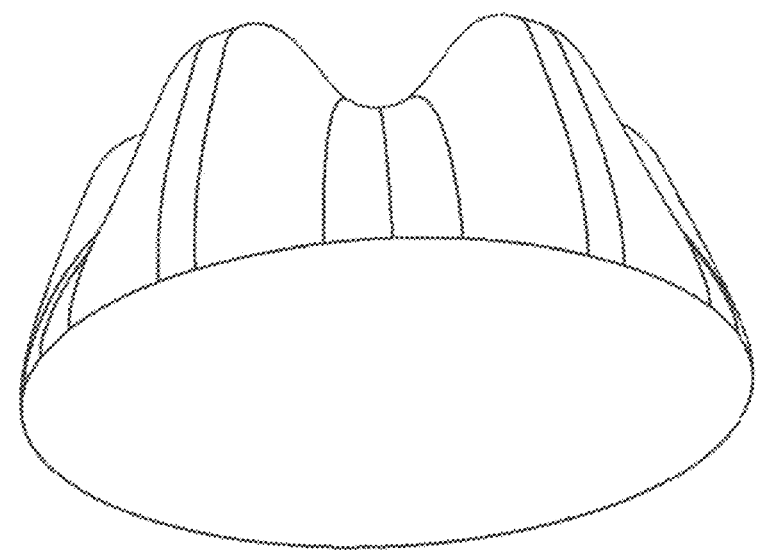

FIGS. 10 and 11 each show (different) views of a base region 2 of a plastic container 1 according to the invention, according to one embodiment. In comparison to the base area 2 of the prior art base (shown approximately in FIGS. 2-8), the base area 2 has a new, improved tension band geometry.

Figure 12:
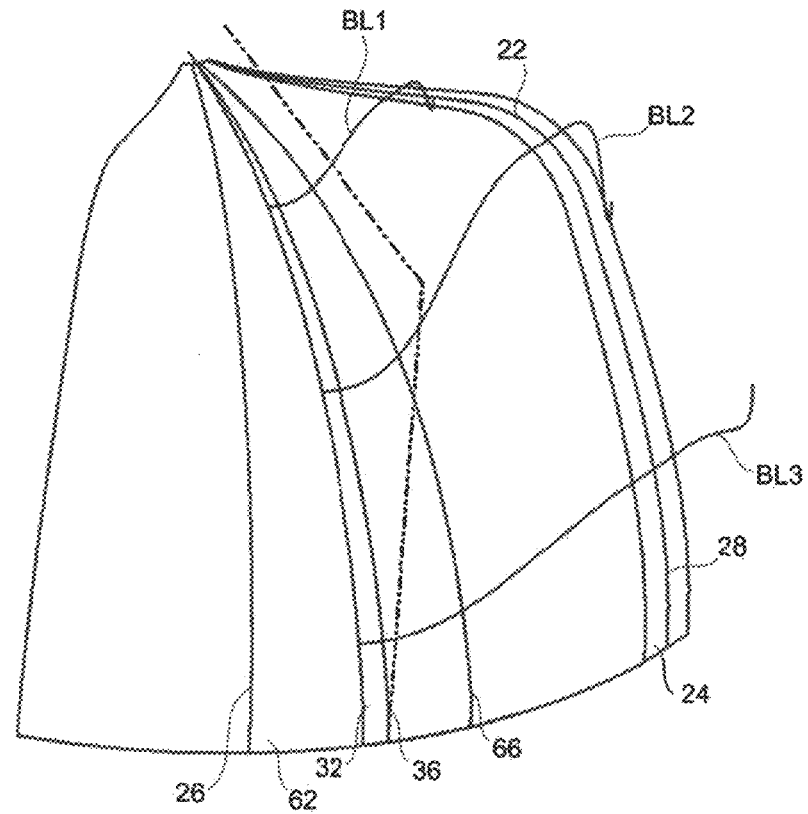
FIGS. 12, 13, 21, 22 and 23
Figure 13:
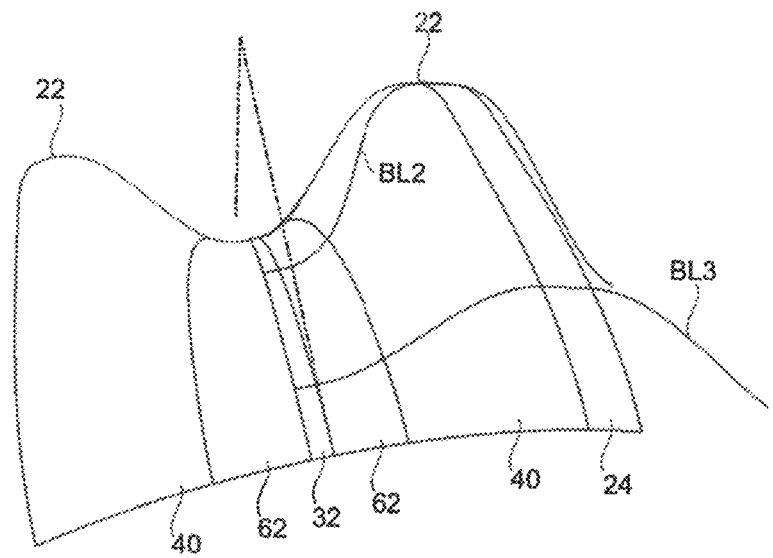
Figure 21:
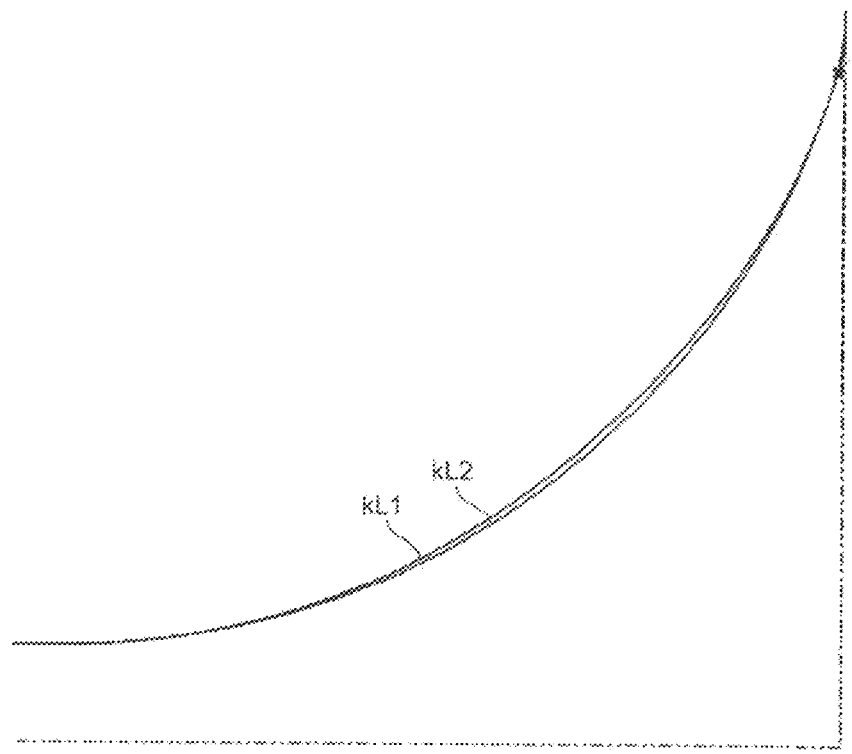
Figure 22:
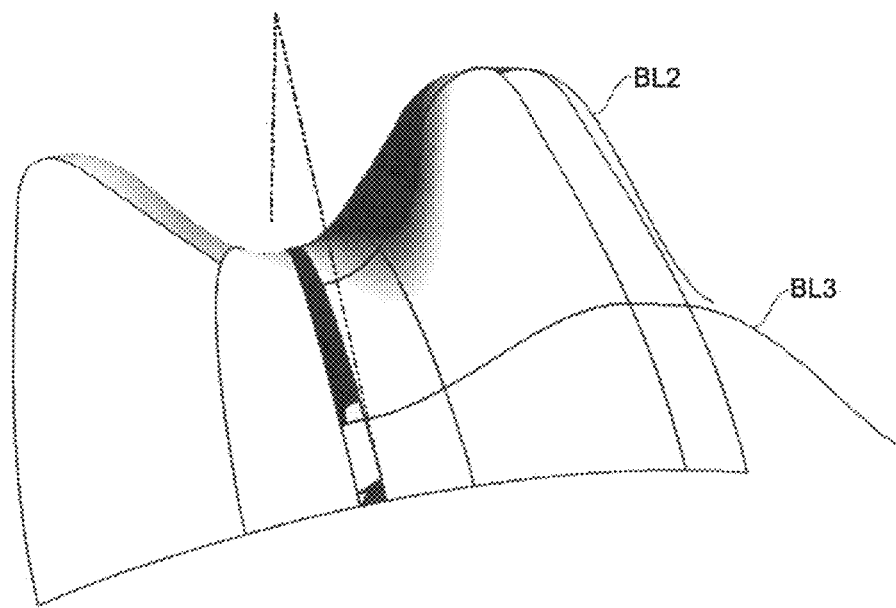
Figure 23:
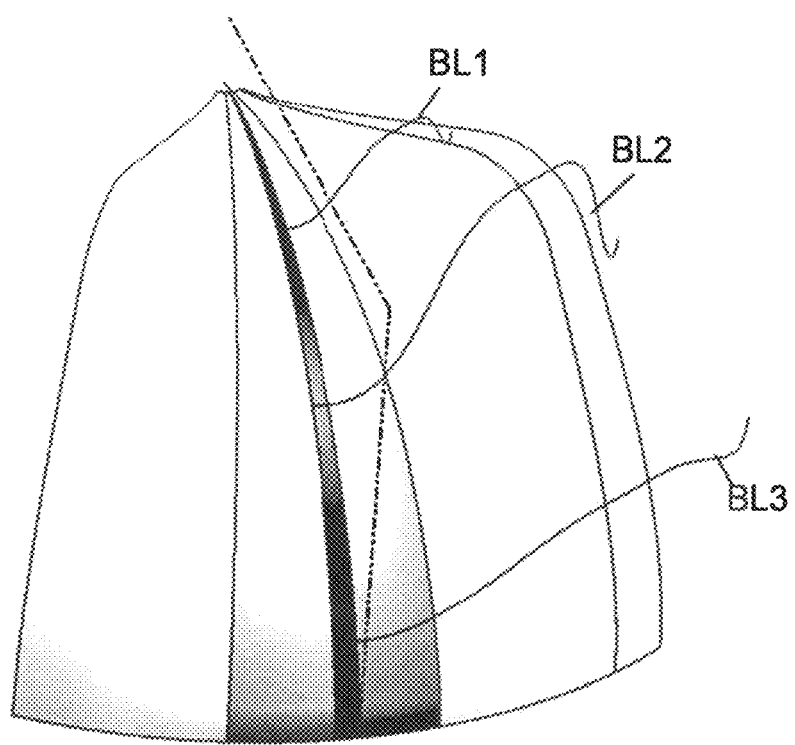

The two FIGS. 12 and 13, as well as FIG. 21 (corresponding to the dashed line representation in FIGS. 12) and 22 (corresponding to the dashed line representation in FIG. 13) and also FIG. 23, show different perspective views of a base region 2 according to the invention with a tension band 62 or groove base 62. modified in comparison with the groove base 32 or tension band 32 of the prior art base selected in FIGS. 2-8. The reference numeral 62 characterizes the tension band geometry of the new improved tension band. Reference numeral 32 denotes the tension band geometry of the prior art.

In the new tension band 62, a larger segment (from 5° to 15°) than in the prior art was used for construction in order to add a harmonious transition from the tension band into the foot flanks (surface 40), so that the material can slide better into the foot flanks and can be drawn from the center in the radial direction.

The tension band geometry 62 here has an at least tangential- and/or curvature-continuous transition into the foot flanks (surface 40).

FIGS. 12 and 13 also show base lines BL1-BL3 formed on the base region, which follow a circular course in the projection in the longitudinal direction L onto a plane E, which is perpendicular to the longitudinal direction L and the centre axis M. Each of these base lines has a sinusoidal course. Depending on the position of the individual base lines with respect to the radial direction R, these have different amplitudes, the largest amplitudes having those base lines BL2 in the vicinity of a standing foot 22.

Figure 16:
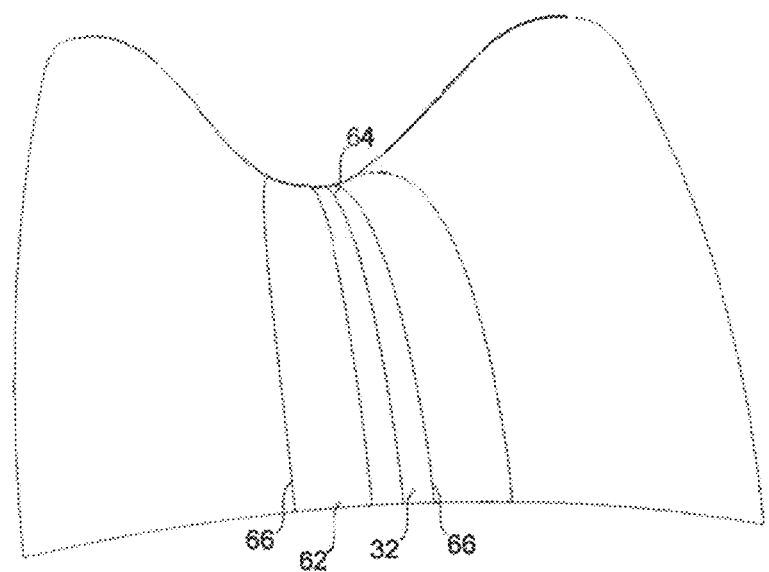
Figure 17:
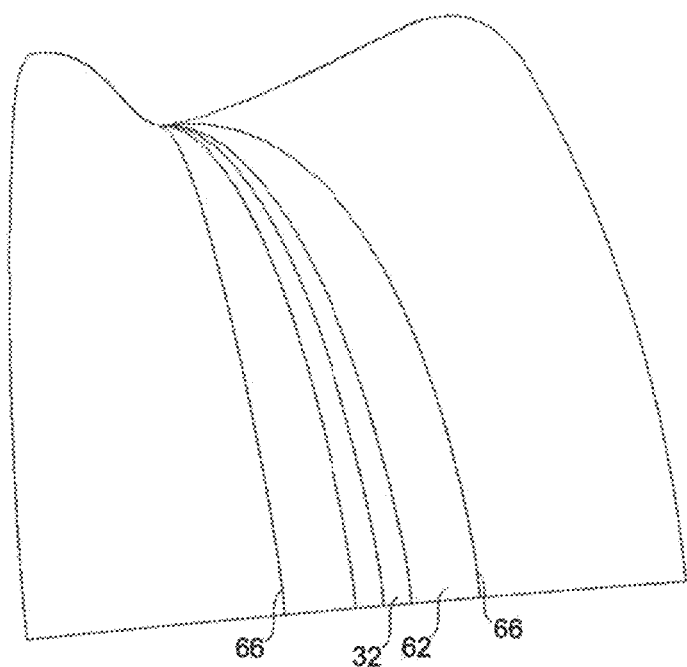
Figure 27:
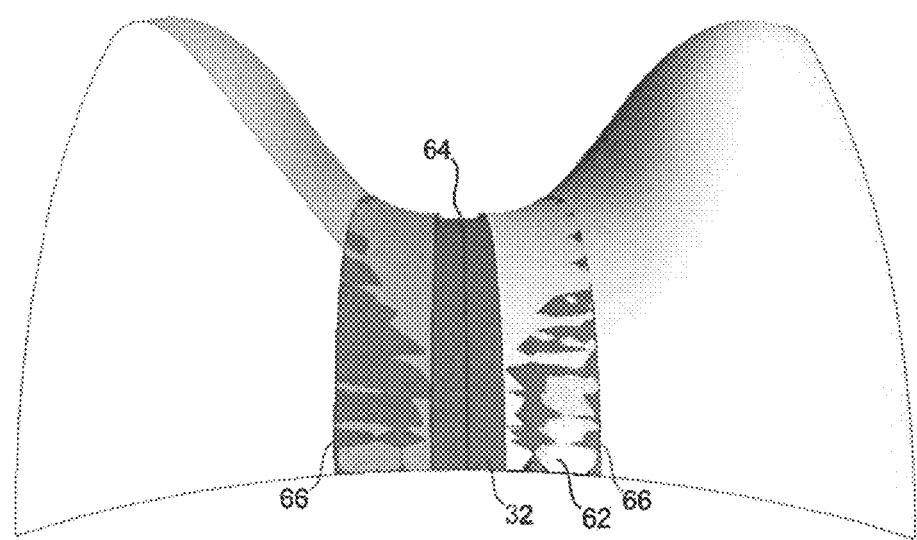
Figure 28:
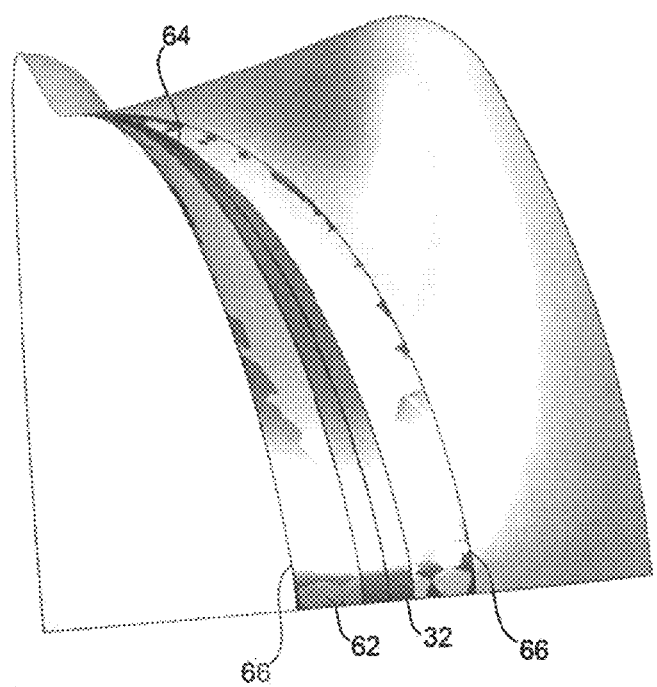

Similarly, FIGS. 16 and 17, as well as FIG. 27 (corresponding to the dashed line representation in FIGS. 16 and 28 (corresponding to the dashed line representation in FIG. 17, show comparison of a groove base 62 in accordance with a preferred embodiment of the present invention to a groove base 32 constructed in accordance with a prior art base region (such as that of DE 10 201 3 110 139 A1) from a different perspective view.

In addition to the respective boundary lines 66 of the groove base 62, the position of the geometric centre 64 of this groove base 62 can also be seen, while the region of the groove base 62 surrounding the geometric centre 64 has not been shown or cut out. As a result, it is possible, in the same illustration, to also represent the geometric position of the prior art groove base 32, which is located on the side of the base region facing the container interior according to the preferred embodiments according to the invention shown in FIGS. 16, 17, 27 and 28.

In particular, the geometric center 64 of the prior art groove base is preferably spaced apart substantially along its entire length.

FIG. 14 shows a cutout of a base region according to the invention in the region of a groove 60. The groove base 62 and an adjacently arranged standing foot 22 and standing region 24 are seen. The container base, starting from the standing foot 22 and a standing region 24, merges via a foot flank surface 40, in particular on both sides, into a groove base 62.

Again, it can be seen that the foot flank surfaces 40 have a transition to the tension band 62 which is at least tangential- or curvature-continuous. Furthermore, the (new) tension band 62 here has a curved course (of a base line, for example of the drawn-in base line BL3) in the region of the tension band.

The new tension band geometry 62 makes it possible to better control the material distribution in the tension band 62. Since the PET material can slide better with the curved course, the accumulations of material from the old tension band 32 (of the prior art base) are eliminated. As a result, the positive effects are obtained that the material can be distributed even better, and can thus be drawn into the flanks of the foot and higher in the tension band.

This has positive effects on the wall thickness in the soil, the thermal test, the bursting test and the stress crack. This is particularly noticeable at the 2.0l to 3.5l volumes, but will also have the same effect at the smaller volumes. The final blowing pressure can therefore preferably be reduced.

FIG. 14 furthermore shows a base line BL3, which runs from a boundary or edge of the standing area 24 over the foot flank surface 40 towards the groove base 62, extends over the latter and from there extends over a further foot flank surface 40 to the lateral edge or lateral boundary of a standing area 24 of the adjacently arranged standing foot. As can be seen, the base line BL3 does not run over the standing surface of the container, but in a region of the container base, which lies between the standing region of the container base and the main body. The base line BL3 therefore runs in a middle (viewed in the longitudinal direction) region of the container bae. The course of a base line in this area is comparable with the course of a base line which extends over the standing area of the container floor or standing foot, however, since the central area of the container base already represents a transition area to the main body of the container, the amplitudes or deflections of the base line BL3 in the longitudinal direction are no longer as strongly pronounced as in the case of a base line running in the standing area of the container.

Also shown in FIG. 14 by the line KV3 is a curve of curvature of the base line BL3. The line KV3 shows a measure for the curvature at a respective point of the base line BL3.

It can already be seen from the course of the base line BL3 itself that, when the course of the base line from the left-hand side of the figure follows in the direction of the right-hand side of the figure, first a first region of the groove and a first region of the foot-flank surface 40, which in particular laterally adjoin a standing foot (not shown) and a standing region (not shown), is curved outwards. In relation to the plane of the figure or the plane of the paper, this region has a curvature (or curvature) outwards, that is to say out of the plane of the paper or the plane of the figure. As the curvature curve KV 3 shows, the curvature initially increases strictly monotonically and in a continuous manner until a maximum curvature value is reached and decreases continuously and in a strictly monotonous manner until a value 0 is reached. At this point of the base line, it has an inflection point at which the orientation or sign of the curvature reverses. The reference symbol W1 indicates the position of the inflection point on a base line, BL3 between a standing region and the groove base. After reaching this inflection point W1, the curvature value continues to decrease continuously and in particular in a strictly monotonous manner. As can be seen from FIG. 14, the magnitude of the curvature value increases steadily after reaching the inflection point W1. It is possible that the magnitude of the curvature value decreases again shortly before reaching the groove base.

After reaching the inflection point W1, therefore, as can also be seen from the subsequent course of the base line BL3 of FIG. 14, the region of the foot flank surface 40 or the groove is curved in the other direction, ie toward the inside. Toward the inside, in this case, in the direction of the interior of the container and in the choice and position of the base line BL3 shown in FIG. 14, a curvature is directed into the plane of the figure or into the plane of the drawing.

The reference numeral 62 in turn characterizes the region of the groove base, which in particular has the functions of a tension band. It can be seen that the groove base from the injection point 18 or from the geometric center of the container base or base region 2 of a container 1 increases in the radial direction toward the outside or in the radial direction toward a side wall of the main body. The groove base 62 corresponds to a predetermined angular segment of the base region. In particular, the two boundary lines, which are identified by the reference numeral 66, enclose the same predetermined circumferential angle relative to the central axis and a rotation in the circumferential direction about the central axis over their entire extent in the radial direction.

Referring now to FIG. 14, there are shown two aspects which distinguish the container base according to the present application from a container base according to the prior art. On the one hand, the circumferential angle of the groove base is substantially greater than the circumferential angle α from the prior art. The groove base thus preferably extends over a comparatively larger opening angle or circumferential angle. On the other hand, the groove base is curved inwards along the base line BL3. This inward curvature is symbolized by the course of the curvature line KV3 below the course of the base line BL3. From a region out of the container interior, such as, for example, from a mouth region of the container or from the region of the central axis M of the container, which is arranged closest to the region of the base line 3, concavely curved.

In the embodiment of a base region illustrated in FIG. 14, the base region has a varying curvature along the base line BL3 in the region of the groove base, that is to say between the two points BN on the base line BL3. In particular, the curvature value in the region of the groove base 62 along the base line BL3 is just not constant. It is conceivable, for example, that the magnitude of the curvature value initially decreases continuously and in particular (strictly) monotonically, preferably at the geometric centre of the groove base, reaches a minimum amount of the curvature value and increases monotonically from there continuously and (strictly) monotonically. Preferably, the magnitude of the curvature value at the two edges of the groove base along a base line assumes a maximum value.

As can be seen from FIG. 14, the course of curvature KV3 along the base line BL3 in the region which adjoins the groove base to the right side of the figure is corresponding to that curve KV3 which adjoins the groove base 62 to the left side. Thus, the base line BL3 extends first through a region of the container base, which has a curvature inward. In a region of the groove and in a region of the foot flank surface 40, the curvature curve KV3 reaches a point W2 at which the curvature is 0. W2 thereby characterizes a further point of inflection of the curvature. Following this inflection point W2, the curvature or curvature again reverses, so that between this inflection point W2 and the standing region 24 of the standing foot arranged adjacently along the base line BL3, outwardly curved or outwardly curved wall regions are present.

Considering the course of curvature KV3 along the base line BL3 at the two points BN at which the groove base merges into the remaining region of the groove or the foot flank surfaces 40, it can be seen from FIG. 14 that the curvature at these points has a jump. The course of curvature KV3 of a base line BL3 cannot be continuous, in particular at a region in which the groove base 62 merges in a laterally adjacent region (for example, the remaining groove and/or a foot flank surface). However, unlike in the embodiment illustrated here, it is also conceivable that the course of curvature is also constant in curvature at the points BN in which the groove base merges along a base line BL3 in a region 40 (such as a foot flank surface and/or a remaining region of the groove) arranged laterally on the groove base 62.

Preferably, the groove base 62 has a region in which the wall of the container base is curved inwards at each point, this region being arranged between an injection point 18 and/or a central region surrounding this injection point 18 and/or a inflection region surrounding the central region and/or the injection point on the one hand and a inflection region WN arranged adjacent to the basic body of the container. Preferably, this region almost completely occupies the region of the groove base 62 between the injection point or a central region surrounded by the latter and the adjacent main body. Preferably, there is a inflection region WN in the vicinity of the main body, in which the wall of the base region is no longer curved inwards, but is preferably curved outwards.

Following an imaginary line along the container wall in the radial direction to the outside, corresponding to the course indicated by the arrow PR in FIG. 14, and considering in each point of this imaginary line a base line, such as symbolically indicated by the base line BL3, the curvature of each individual of these base lines runs over the entire course of the imaginary line in a similar manner to that of the base line BL3, and in particular the respective curvature has the same orientation over almost the entire course of the imaginary line, such as that of the base line BL3. The orientation of the curvature of such a base line preferably changes only when the inflection region WN is reached. Preferably, the radial extent of this inflection region, in which the orientation of the curvature of a base line changes, in particular in the region of the geometric centre of the groove base, changes in such a way that the wall of the container base is no longer curved inwards in this region, less than 20%, preferably less than 10%, preferably less than 5% and particularly preferably less than 2.5% of the container diameter on the circumferential line UL and in particular the point of intersection with the geometric centre of the groove base. The circumferential line UL describes in particular a boundary and/or a transition between the base region of a container and the main body of a container.

For ease of illustration of the three-dimensional shape, FIG. 24 shows the base portion of FIG. 14 with corresponding surface shades.

FIG. 15 and the two dashed line representations of FIGS. 25 and 26 show a further comparison of a portion of the prior art container base with a portion of a container base in accordance with a preferred embodiment of the present invention. These figures illustrate in a special way the different construction of the tension band or groove base of the container base.

The container base is illustrated from a viewing direction against to an almost radial direction approximately from the outside in the direction of the central axis. The regions between two adjacent feet are shown, the standing regions of the containers themselves being no longer shown. The groove 60 between the two feet is formed, among other things, and/or bounded by the two foot flank surfaces 40.

Reference numeral 62 designates the groove base according to a preferred embodiment of the present invention. This groove base 62 is not shown in its entirety, but is cut out around the region of a geometric center of the groove base along the two lines 36'. The dashed line 64 shows the course of the geometric center of the groove base according to the preferred embodiment of the present invention. The two lines indicated by the reference numeral 66 show the transition or boundary of the groove base to the laterally adjacent region, for example the foot flank surfaces 40.

As a result of the cutout from the groove base 62, it is possible to present a groove base 32 which is constructed according to the prior art and which is located further close to the central axis of the container in the radial direction in comparison with the groove base 62. The reference numeral 34 designates the geometric centre of the state-of-the-art groove region 32. The geometric centre 32 is enclosed over its entire course, in particular in the same way as the prior art groove base 32 from a groove base 62 according to a preferred embodiment of the present invention. In other words, the state-of-the-art groove base and in particular its geometric centre 34 is preferably arranged in the interior of the container, which has a bottom base according to an embodiment of the present invention.

Figure 18:
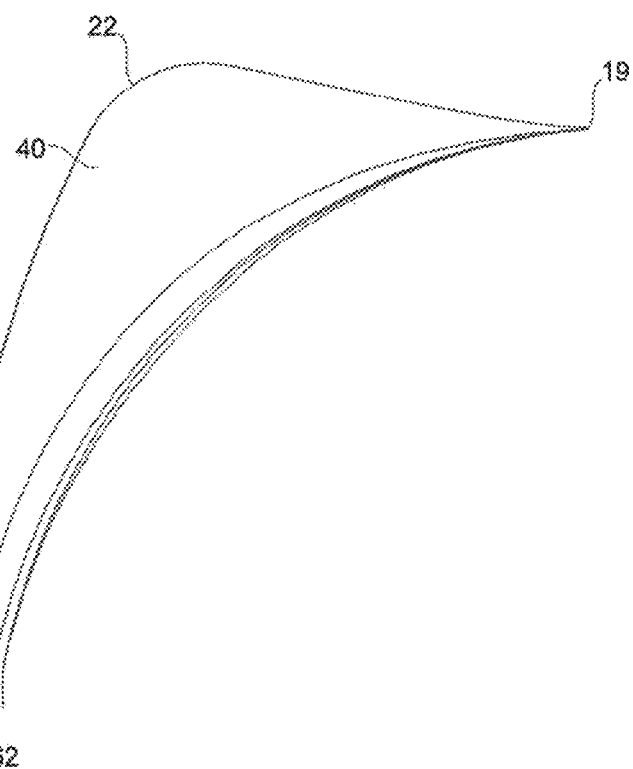

FIG. 18 shows a portion of a base region of a preferred embodiment of the present invention. An angle segment of the base region between a standing foot 22 and the geometric center of a groove base 62 can be seen. It can be seen that the linear guide over the standing foot 22 as well as the geometric centre of the groove base 62 in each case converge inwards in the radial direction and meet in the geometric centre 19 of the container. The foot 22 merges over the foot flank surface, which in turn is identified by the reference numeral 40, into the groove base 62. The boundary line of the base region, which is located furthest outward in the radial direction, relative to the geometric center 19, is again identified by the reference symbol UL. The reference numeral KV designates the course of curvature of a line along the geometric center of the groove base 62. It can be seen here that, in a region which is arranged close to and/or adjacent to the circumferential line UL and thus close to the main body of the container, the curvature curve KV has an inflection point.

This is particularly clearly recognizable in FIGS. 19 and 29 (FIG. 29 corresponds to the broken line representation in FIG. 19, through the crosses K1 and K2 shown therein). The two representations in FIGS. 19 and 29 correspond to enlarged representations of a base region at the intersection of the geometric centre of a groove base and the circumferential line UL or the edge region of the base region, which is arranged adjacent to the main body in the longitudinal direction.

Figure 20:
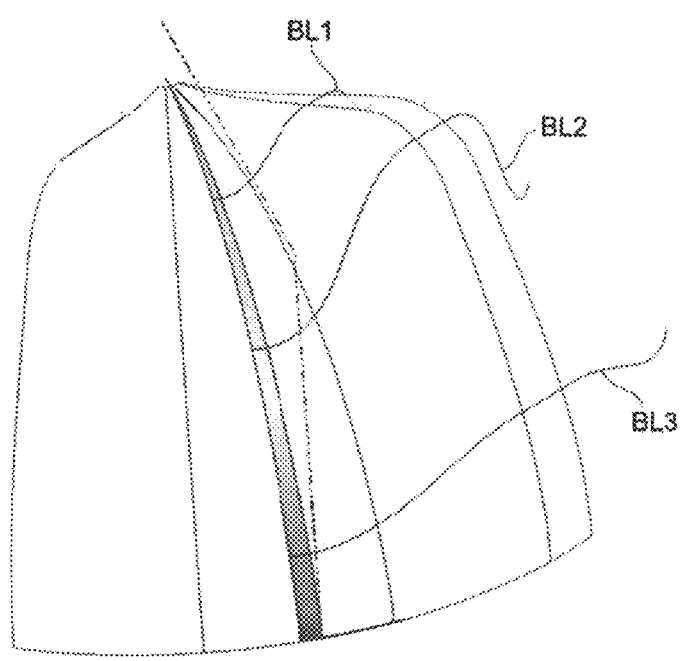

Finally, FIG. 20 shows a comparison of a contour line KL2 of a groove region according to a preferred embodiment according to the invention of a groove region of a container with a contour line KL1 of a groove base of a container from the prior art. The reference symbol KR characterizes the course of curvature of the contour line KL1.

The two contour lines KL1 and KL2 can be formed, for example, from the formation of a cross section of the container base with a plane which extends in the longitudinal direction and in a radial direction and through the groove base approximately through its geometric centre. As can be seen from FIG. 20, in the improved tension band or groove base, the surface of this tension band approaches in such a cross-sectional representation of the contour line or radius of the tension band, in particular in its geometric centre. However, as a result of the increased opening angle in comparison with the prior art, which is used to construct the tension band or groove base according to the present application, the spline for the creation of the new tension band surface or of the new groove base is defined in the foot flank, as a result of which the deviation occurs in a central region (see FIG. 20).

FIG. 30 shows a preferred embodiment of the tension band or groove base of a plastic container according to the invention 1. According to this preferred embodiment, the tension band cross-sectional contour with the two radii R RFU and R 42,441 is connected from the centre to the circumference of the bottle.

This geometry cannot absorb sufficient force at an internal pressure of up to 5.5 bar. For this reason, the base centre around the injection point can no longer hold the desired base clearance in the finished blown bottle, which leads to the fact that the optics and the ground performance, in the form of wall thickness, bursting test, thermal test and stress crack result, can no longer be kept at such high internal pressures as the applicant has established in complicated laboratory tests.

The reference numeral 33 in FIG. 30 characterizes a groove base cross-sectional contour or a tension band cross-sectional contour, which can be obtained, for example, with a cross section along the longitudinal axis L of the container through a base region (in the region of a groove base or tension band) of the container. As illustrated by the two radii RS (or R 42,441) and R RFU=6,500 in FIG. 30, the groove base cross-sectional contour or a tension band cross-sectional contour has two circular-line-shaped sections (with different radii). Point A and point B designate points of the groove base cross-sectional contour or the tension band cross-sectional contour, in which the latter merges into a straight section and/or from which a straight course follows.

FIG. 31 shows a further preferred embodiment of the tension band or groove base of a plastic container 1 according to the invention, in which the two radii from FIG. 30 are replaced by a spline for further improvement of the tension band cross-sectional contour. The curvature of the spline can preferably be described by a polynomial of the n-th degree. The degree n is preferably between degree 2 and degree 7. The transition from the centre of the base, designated by point A in FIG. 31, (to the tension band) is particularly preferably continuous in curvature, but preferably at least tangential continuous. The transition from the spline (in particular from the tension band, preferably formed by a spline) into the circumference of the bottle, in FIG. 31, characterized by point B, is preferably continuous in curvature, but preferably at least tangential continuous. This offers the advantage of improving the base clearance on the blown bottle.

The transition control can be controlled by the tangent values of the spline at points A and/or B. The values for the magnitude of the tangent vector (which in particular represents the percentage of the tangential in the start and end values) can move between 0.1 and 2.5. The values may be the same in points A and B, but they may also be different.

A further variant of the spline can be described by a conical transition control. Here, the transition control is controlled by a value Rho. This value may be between 0.01 and 0.99. In particular, a small Rho value produces a flat cone while a large Rho value produces a sharp cone.

In FIG. 31, in addition to the possible groove base cross-sectional contour 33 or tension band cross-sectional contour 33 known from FIG. 30, a further preferred embodiment of a base contour of a groove base or a tension band (or groove base cross-sectional contour or tension band cross-sectional contour 35) is shown, which is characterized by the reference number 35. It preferably has a region which can be described by a spline of the n-th degree.

This spline preferably adjoins a base body connection region SB, which preferably has a straight section and/or is configured in a straight line, and which adjoins the main body of the container. The spline preferably adjoins a centre point transition section SA, which adjoins a geometric centre of the container base or a central region of the container base or an injection point of the container.

The main body connection section preferably has a circular and/or curved section, which adjoins the spline, in particular.

Preferably, the mid-point transition section SA has a rectilinear section S1 and/or a further substantially rectilinear section S2, which likewise runs rectilinearly or has only a slight curvature (in particular in comparison with the spline in a central region of the spline).

Preferably, the spline of the base contour or groove base cross-sectional contour 35 can be completely included into a circular line. In other words, the spline lies completely within a circle, the circular line of which runs through an initial point and an end point of the spline.

Preferably, the spline occupies most of the arc length of the base contour of the groove base or most of the arc length of the groove base cross-sectional contour 35.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

1 Plastic container
2 base area
4 main body
6 Mouth region
8 container mouth
18 Injection point
19 geometric center of the base wall (or base region)

22 standing foot
24 standing region/standing portion
25 Foot geometry
26 boundary line of the standing region 24
28 geometric center of the standing region 24
30 groove
32 groove base
33 groove base cross-sectional contour/tension band cross-sectional contour, base contour
34 geometric center
35 groove base cross-sectional contour/tension band cross-sectional contour, base contour
36 boundary line of the groove base 32
40 Foot flank surface
50 side wall
60 groove
62 groove base
64 geometric center
66 boundary line of the groove base 62
a, b points of transition
BL1, BL2, BL3 ground lines
BN Boundary groove base
KL1, KL2, KL3 are circular lines in plane E
KV3 curve of curvature of the base line BL3
KV, KR Curvature course
K1, K2 Cross
KL1, KL2 contour line
L longitudinal direction
LW line
M center axis
p34, p36, p26 boundary lines 34, 36, and 26 projected on plane E
PR arrow
R radial direction
S1, S2, SA, SB portions of the groove base cross-sectional contour
U circumferential direction
UL perimeter line
W, WN inflection point
W1, W2 Inflection point
WB inflection region

The invention claimed is:

1. A plastic container having a base region, a main body extending in a longitudinal direction (L) of the plastic container to said base region and a mouth region with a container mouth, with the mouth region adjoining said main body in the longitudinal direction (L) at least indirectly, wherein the base region has at least three standing feet, wherein at least one groove having a groove base extending in the circumferential direction (U) over a circumferential angle is arranged between two adjacent standing feet,
wherein the container is formed in one piece,
wherein
a wall of the container is curved inwards at least in sections in the region of the groove base of the groove, wherein
a width (BR) of the groove base increases outwards in a radial direction of the container, and the at least one groove base has a circumferential angle which is between 5° and 15°, wherein the at least one groove base is arranged substantially symmetrically with respect to the circumferential direction between the two adjacent standing feet.

2. The plastic container according to claim 1, wherein a curvature of a line formed along the base region, which extends from a standing foot or a standing region surrounding a standing foot over the groove base, changes in the groove base by less than 30%.

3. The plastic container according to claim 1, wherein the wall of the container is curved inwards at least in sections in a laterally adjacent region of a geometric centre of the groove base.

4. The plastic container according to claim 1, wherein the wall of the container is curved inwards at least in sections along a geometric centre of the groove base.

5. The plastic container according to claim 1, wherein a region of the base section, which region is arranged between a standing foot and a groove base, merges in a tangent-continuous and/or curvature-continuous manner into the groove base.

6. The plastic container according to claim 1, wherein at least one line which runs in the radial direction, runs on the surface and runs at least in sections through a groove base, has an inflection region in which a surface region of the base section changes the orientation of its curvature.

7. The plastic container according to claim 1, wherein a groove basic cross-sectional contour with a cross-section along the longitudinal direction (L) of the container follows a spline of n-th degree at least in sections.

8. The plastic container according to claim 1, wherein a section of each groove base, which can be described by a spline, merges continuously and/or with a constant curvature into a straight, section of the base region, which section adjoins the spline.

9. The plastic container according to claim 1, wherein a curvature of a line formed along the base region, which extends from a standing foot or a standing region surrounding a standing foot over at least one groove base, changes in the groove base by less than 25%.

10. The plastic container according to claim 1, wherein curvature of a line formed along the base region, which extends from a standing foot or a standing region surrounding a standing foot over at least one groove base, changes in the groove base by less than 20%.

11. The plastic container according to claim 1, wherein curvature of a line formed along the base region, which extends from a standing foot or a standing region surrounding a standing foot over at least one groove base, changes in the groove base by less than 15%.

* * * * *